United States Patent [19]
Yajima

[11] Patent Number: 5,583,558
[45] Date of Patent: Dec. 10, 1996

[54] RECORDING APPARATUS FOR CARRYING OUT HIGH-DENSITY DOT PRINTING

[75] Inventor: Toshiaki Yajima, Iruma, Japan

[73] Assignees: Casio Electronics Manufacturing Co. Ltd.; Casio Computer Co., Ltd, both of Tokyo, Japan

[21] Appl. No.: 225,443

[22] Filed: Apr. 8, 1994

[30] Foreign Application Priority Data

Apr. 15, 1993 [JP] Japan .................................... 5-088248

[51] Int. Cl.$^6$ ............................... B41J 2/47; B41J 2/435
[52] U.S. Cl. ............................................. 347/240; 347/237
[58] Field of Search ...................................... 347/240, 237, 347/241

[56] References Cited

U.S. PATENT DOCUMENTS 4,780,731   10/1988   Creutzmann ........................... 347/237

FOREIGN PATENT DOCUMENTS

| | | |
|---|---|---|
| 0299653A2 | 1/1989 | European Pat. Off. . |
| 0396352A3 | 11/1990 | European Pat. Off. . |
| 0488534A3 | 6/1992 | European Pat. Off. . |
| 0522980A3 | 1/1993 | European Pat. Off. . |
| 0526738A2 | 2/1993 | European Pat. Off. . |

OTHER PUBLICATIONS

Patent Abstracts of Japan, vol. 15, No. 21 (M–1070), Jan. 17, 1991 & JP-A-02 266 966 (Matsushita Electric Ind. Co., Ltd.), Oct. 31, 1990.

Patent Abstracts of Japan, vol. 16, No. 546 (E–1291), Nov. 16, 1992 & JP-A-04 207 664 (Matsushita Electric Ind. Co., Ltd.), Jul. 29, 1992.

*Primary Examiner*—Benjamin R. Fuller
*Assistant Examiner*—Thinh Nguyen
*Attorney, Agent, or Firm*—Frishauf, Holtz, Goodman, Langer & Chick

[57] ABSTRACT

A recording apparatus has an array of recording elements arranged in a main scanning direction and having a predetermined dot pattern, and forms a dot image on a recording medium located opposite to the recording elements. Reception circuit receives image data of a predetermined dot density. A plurality of line buffers store one dot line of data of interest as a printing target among the image data and aligned in the main scanning direction, and plural dot lines of data preceding and following the one dot line with respect to a sub-scanning direction. A compensation data generating circuit converts the one dot line of data of interest as the printing target into N lines of compensation data, divided by N with respect to the sub-scanning direction, based on the plural dot lines of data preceding and following the one dot line. A control circuit controls the time for activating the recording elements based on the compensation data. Recording will therefore be accomplished with a dot recording density in the sub-scanning direction different from the dot density of the image data.

10 Claims, 26 Drawing Sheets

FIG.8C
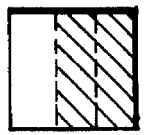
FIG.8F
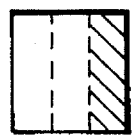
FIG.8B
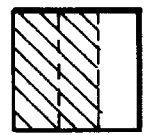
FIG.8E
U-LINE →
M-LINE →
L-LINE →
FIG.8A
FIG.8D
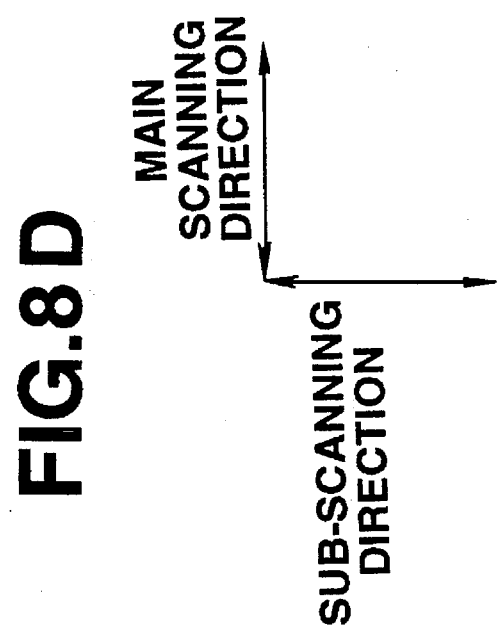

| INPUT1 | INPUT2 | OUTPUT |
|---|---|---|
| 1 | 1 | 0 |
| 1 | 0 | 1 |
| 0 | 1 | 1 |
| 0 | 0 | 0 |

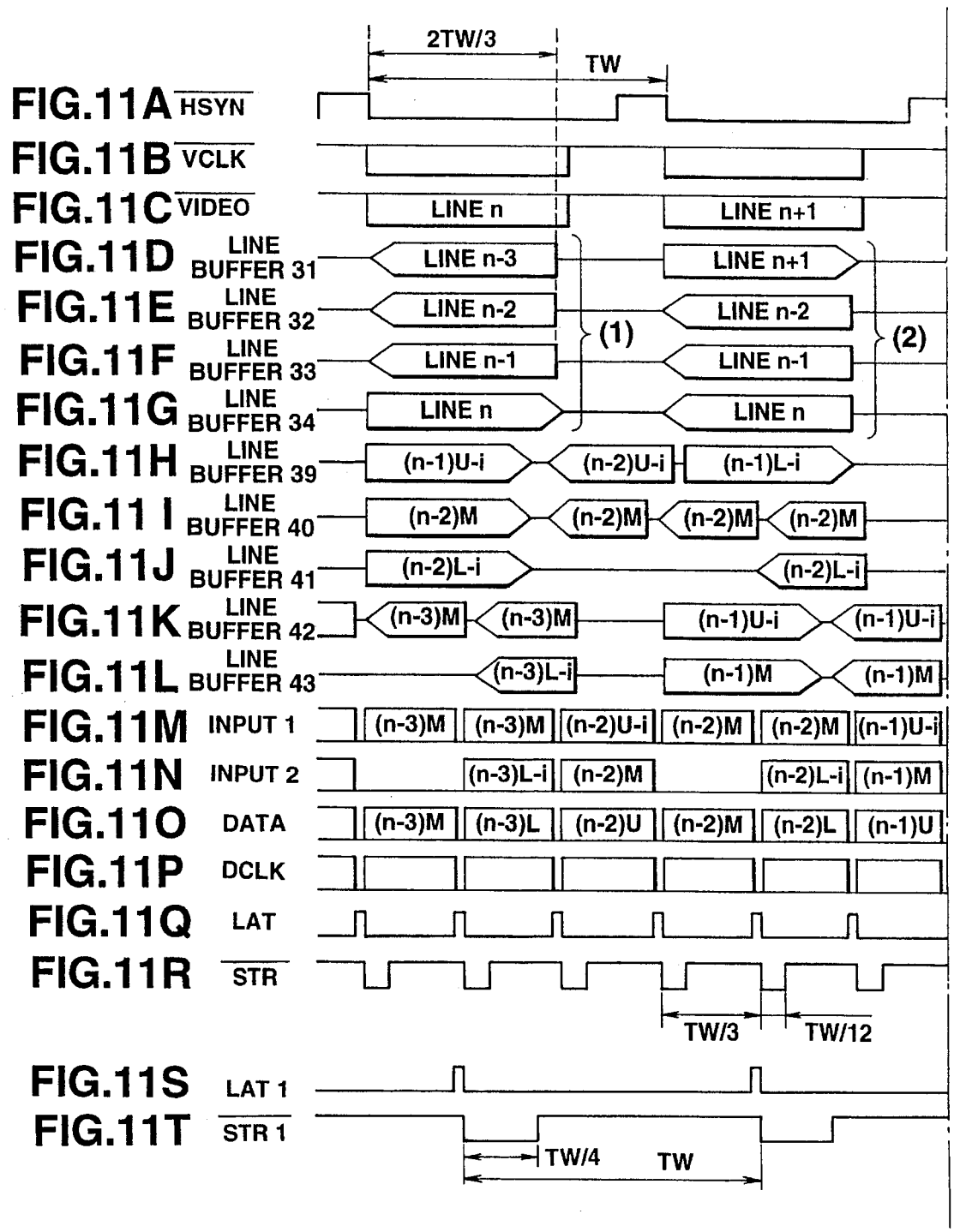

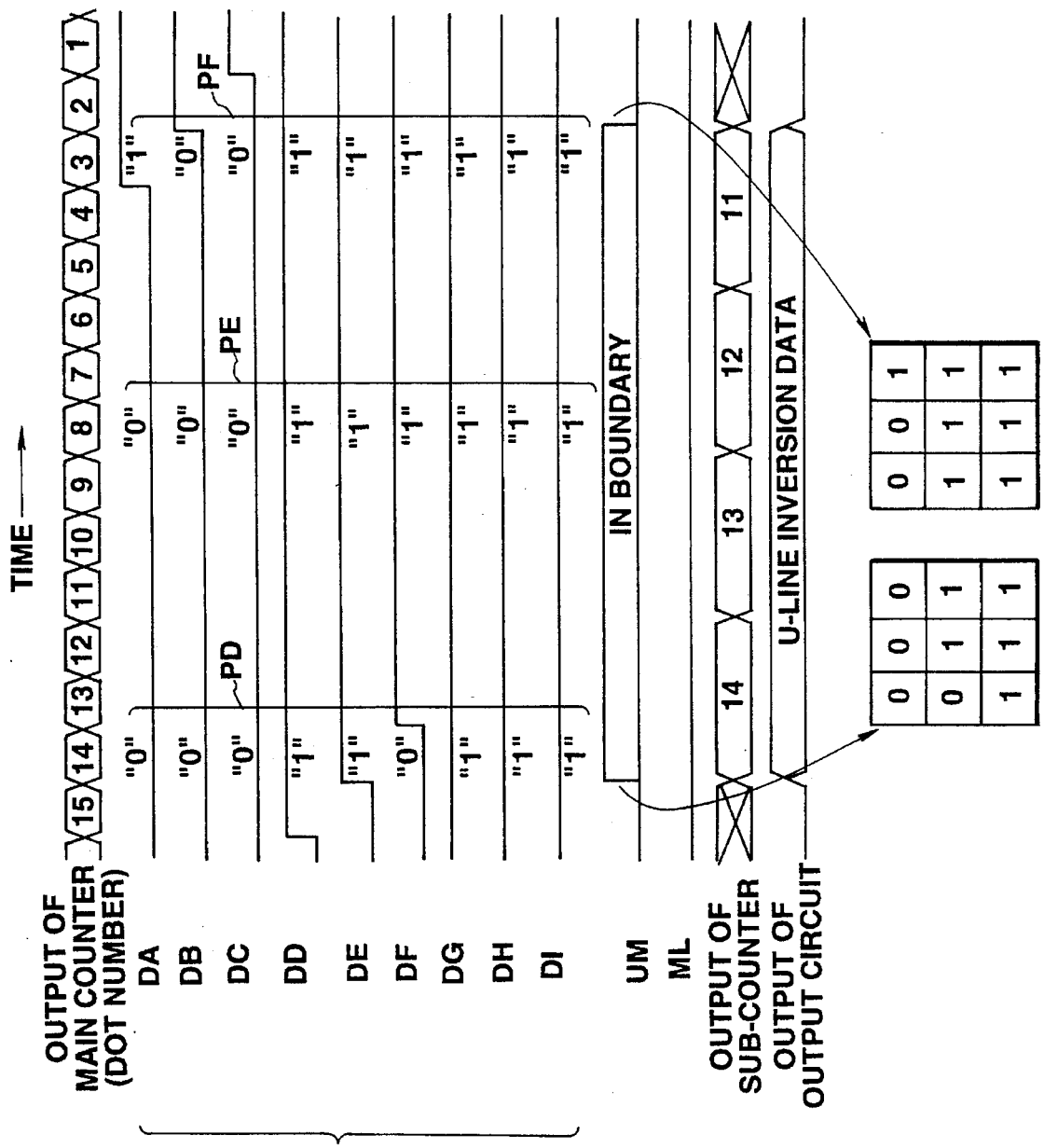

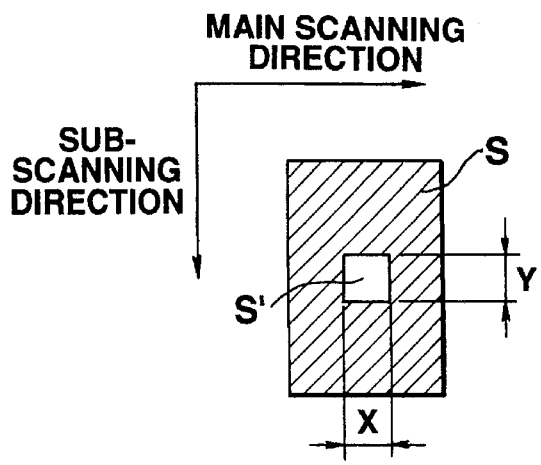
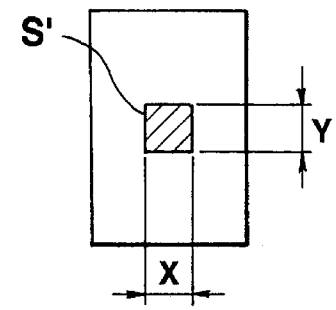
FIG.20 A            FIG.20 B
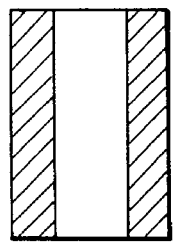    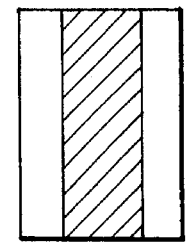
FIG.20 C            FIG.20 D
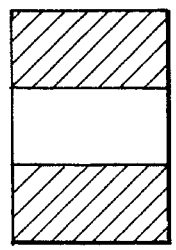    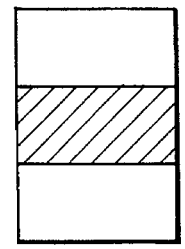
FIG.20 E            FIG.20 F
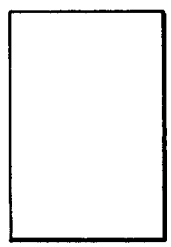    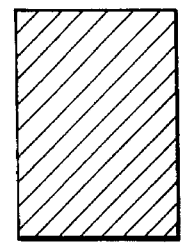
FIG.20 G            FIG.20 H

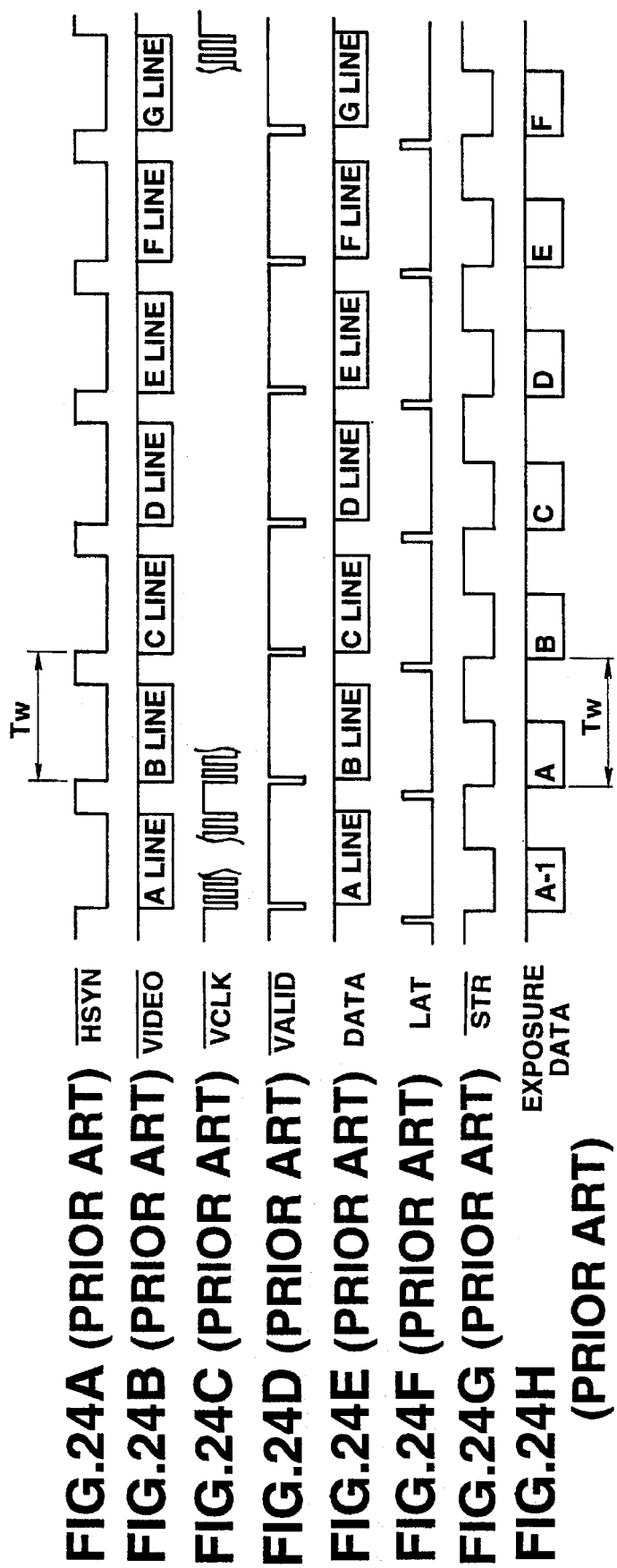

RECORDING APPARATUS FOR CARRYING OUT HIGH-DENSITY DOT PRINTING

BACKGROUND OF THE INVENTION

1. Field of the Invention

The present invention relates to a recording apparatus which prints out a dot image or dot pattern, such as an LED printer or LCS printer. More particularly, this invention relates to a recording apparatus which reproduces a high-density dot image corresponding to a predetermined scanning direction to thereby smoothly express step portions of an image which are formed at oblique line portions.

2. Description of the Related Art

An LED (Light Emitting Diode) printer and LCS (Liquid Crystal Shutter) printer, for example, are known as recording apparatuses which print an image on a recording sheet based on print data that is output from a host computer (host apparatus). FIG. 23A illustrates the basic structure of an LED printer 1 connected to, for example, a host computer 2. Referring to this diagram, the LED printer 1 comprises a printer controller 1a, an engine controller 1b and a PP (Page Printer) engine 1c. The printer controller 1a includes a CPU (Central Processing Unit), a ROM (Read Only Memory), a RAM (Random Access Memory), a character generator and a frame memory. The printer controller 1a receives print data sent via, for example, a centronics interface from the host computer 2.

The printer controller 1a analyzes the print data from the host computer 2. If the print data is a character code, the printer controller 1a converts it into pattern data using the character generator. If the print data is one of various commands, the printer controller 1a executes an associated process. As the above processing is repeated, one page of video signals (pattern data for one page printing) is stored in the frame memory. The engine controller 1b outputs the video signals, stored in the frame memory, to a printing head which constitutes a part of the PP engine 1c to print data on a recording sheet by means of a Printing mechanism. The PP engine 1c means the whole image forming mechanism in the LED printer 1 including the printing head.

FIG. 23B presents a detailed illustration of the internal structure of the LED printer 1, and is a diagram for explaining a printing process. FIGS. 24A to 24H show time charts for the printing process. Referring to FIGS. 23B and 24A to 24H, when a horizontal sync signal HSYN shown in FIG. 24A is output to the printer controller 1a from the engine controller 1b, the printer controller 1a outputs a write valid signal VALID shown in FIG. 24D to the engine controller 1b to output one line of data of the video signals stored in the frame memory. Thereafter, the printer controller 1a outputs the video signals VIDEO, shown in FIG. 24B, to the engine controller 1b in synchronism with a clock signal VCLK shown in FIG. 24C.

More specifically, if the topmost video signals in the frame memory are for an A line, first, the video signals for the A line are output to the engine controller 1b in synchronism with the clock signal VCLK as shown in FIGS. 24B and 24C. Then, the video signals output as a signal DATA to the LED head 1c in synchronization with a clock signal DCLK as shown in FIG. 24E. After temporarily latched in response to a latch signal LAT shown in FIG. 24F, the video signals are exposed on the photosensitive surface of a photosensitive drum in response to a strobe signal STR as shown in FIGS. 24G and 24H.

Thereafter, printing will be done on the recording sheet according to the above-described processes for a B line, a C line and so forth. The photosensitive drum which is moving in the sub-scanning direction is exposed for, for example, a quarter of a write period TW (period of the horizontal sync signal HSYN) by LED elements arranged in the main scanning direction, thereby forming a dot-based electrostatic latent image on the precharged photosensitive surface. The quarter of the write period TW corresponds to a ¼ dot. Therefore, during the quarter of TW, the exposed area moves from an area 25A to an area 25B sifted by ¼ DOP (Dot Of Pitch) in the sub-scanning direction, as shown in FIG. 25. (The areas 25A and 25B appear at different positions for explanation in the main-scanning direction in FIG. 25. However, the areas 25A and 25B exist same position on the photosensitive drum in the main-scanning direction.)

The accumulated amount of exposure changes in the sub-scanning direction as shown in curve 25C. A developing unit applies a proper developing bias level 25D to the photosensitive surface of the photosensitive drum. The area whose amount of exposure exceeds the developing bias voltage is developed as one dot by the developing unit. Therefore, one dot 25E having one DOP in sub-scanning direction is formed on the photosensitive surface, and the dot is transferred to a recording sheet. The developing bias level is so set that the width of the sub-scanning direction is identical to the width of the main scanning direction for one dot to be formed.

The resolution which is a factor to determine the printing quality in the sub-scanning direction of the recording apparatus is determined by the write period TW. In the conventional recording apparatus, the write period TW is the same as the exposure period of the printing head as mentioned above. To improve the resolution of the conventional recording apparatus, therefore, it is necessary to reduce the size of the individual dots. This requires that the write period TW be shortened and the amount of data of the video signals which is to be stored in the frame memory be increased. In other words, increasing the resolution needs an increase in printing density from, for example, 240 DPI to 300 DPI, 300 DPI to 400 DPI, and so forth. This results in an inevitable increase in the capacity of the frame memory. Accordingly, the cost of the recording apparatus increases.

SUMMARY OF THE INVENTION

It is therefore an object of the present invention to provide a recording apparatus which has an improved resolution of reproduced dots and provides printouts with an excellent quality, without increasing the amount of image data to form a dot image, i.e., without increasing the capacity of a frame memory for storing dot image data.

To achieve the above object, there is provided a recording apparatus comprising:

an array of recording elements arranged in a main scanning direction, for forming a dot image on an opposite recording medium;

reception means for receiving image data of a predetermined resolution;

a plurality of line data storage means for storing one dot line of data of interest as a printing target among the image data and aligned in the main scanning direction, and plural dot lines of data preceding and following the one dot line with respect to a sub-scanning direction;

compensation data generating means for converting the one dot line of data of interest as the printing target into N lines of compensation data, divided by N with respect to the sub-scanning direction, based on the plural dot lines of data preceding and following the one dot line; and active-time control means for controlling a time for activating the recording elements based on the compensation data.

BRIEF DESCRIPTION OF THE DRAWINGS

FIGS. 8A to 8F are diagrams for explaining a compensating state when a current line of data is divided by three into data of a U-line, data of an M-line and data of an L-line;

FIGS. 11A to 11T are time charts for explaining the operation of the recording apparatus according to the embodiment;

FIGS. 12A to 12T are time charts for explaining the operation of the recording apparatus according to the embodiment and follow to the time charts shown in FIGS. 11A to 11T, respectively;

FIGS. 15A to 15F are time charts for explaining a case where the specific dot pattern is compensated;

FIGS. 20A to 20H are diagrams showing examples where the compensation is not carried out for some partial areas;

FIGS. 24A to 24H are time charts for explaining the operation of the conventional recording apparatus.

DETAILED DESCRIPTION OF THE PREFERRED EMBODIMENTS

A preferred embodiment of the present invention will now be described referring to the accompanying drawings.

In the present invention, to achieve the object, each line defined by video signals is divided into N lines in the sub-scanning direction. The N lines are compensated or amended based on a length of a boundary (a portion between steps) included in the image defined by the video signals.

Each of the compensated N lines is printed during a TW/N period (TW is printing period of one dot line of original image), thereby obtaining a resolution N times higher than the original resolution in the sub-scanning direction.

An embodiment in which N=3 will be described in detailed below.

Figure 2:
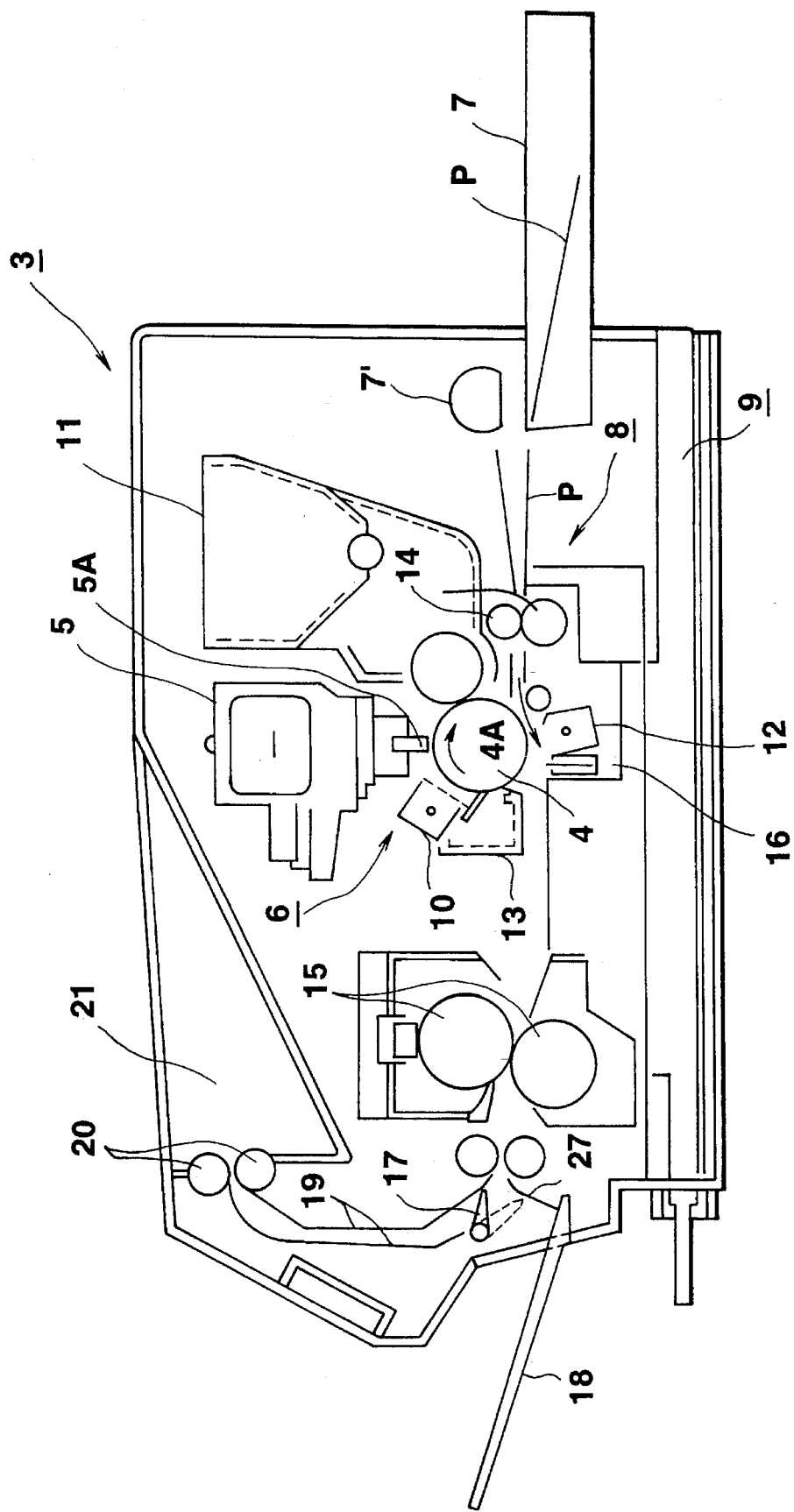
FIG. 2 is a diagram showing the general structure of the recording apparatus according to the embodiment.

FIG. 2 shows a general structure of an LED printer 3 according to this embodiment. The LED printer 3 comprises an image forming section 6, a sheet feeding mechanism 8 and a control circuit section 9.

The image forming section 6 includes a photosensitive drum 4 as image-recording means, which is rotatable in the direction of an arrow 4A, a charger 10, an LED head 5 having an array of many LED elements 5A arranged in a main scanning direction, a developing unit 11, a transfer unit 12, and a cleaner 13. The components 10, 5, 11, 12 and 13 are arranged around the photosensitive drum 4 in the vicinity of the surface thereof.

The photosensitive drum 4 is rotated by driving mechanism so that the drum's surface moves at a given speed. The sheet feeding mechanism 8 includes a sheet cassette 7 for retaining a predetermined number of sheets (generally paper) P, a feeding rollers 7' for feeding the sheets P one by one from the sheet cassette 7, and resist rollers 14 for holding a sheet P temporarily and feeding it at the timing that matches with the speed of a toner image formed on the photosensitive drum 4. Fixing rollers 15 serve to carry the sheet P and fixes the toner image transferred on the sheet P in the transfer process by the transfer unit 12.

A feeding direction switching plate 17 feeds the sheet P toward a face-up discharge tray 18 when located at a solid-line position in FIG. 2 and feeds the sheet P toward a face-down discharge section 21 via a guide plate 19 and discharge rollers 20 when located at a broken-line position.

Figure 3:
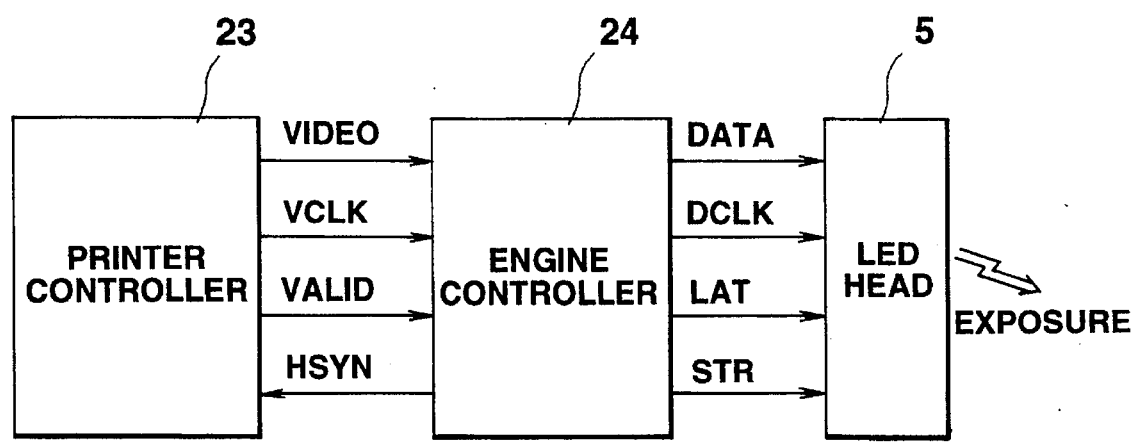
FIG. 3 is a circuit block diagram of the recording apparatus according to the embodiment.

The control circuit section 9 is provided with a printer controller 23 connected to a host computer and an engine controller 24 connected to the printer controller 23 and the LED head 5, as shown in FIG. 3. The printer controller 23 incorporates a CPU, a ROM, a RAM, a character generator and a frame memory. The engine controller 24 incorporates a circuit for performing compensation on the video signals output from the printer controller 23. The engine controller 24 outputs compensation data (compensated video signals) DATA to the LED head 5. The compensation data DATA includes U-line data, M-line data, and L-line data as described later.

In FIG. 3, the horizontal sync signal HSYN indicates output timings of video signals VIDEO; the video signals VIDEO are pattern data defining an image to be printed; the valid signal VALID indicates an output and validity of the video signals VIDEO; the clock signal VCLK indicates output timing of each bit of the video signals VIDEO; the clock signal DCLK indicates output timing of each piece of the compensation data DATA; the latch signal LAT is the trigger signal for latching the compensation data; and the strobe signal STR indicates exposure timings.

Figure 1:
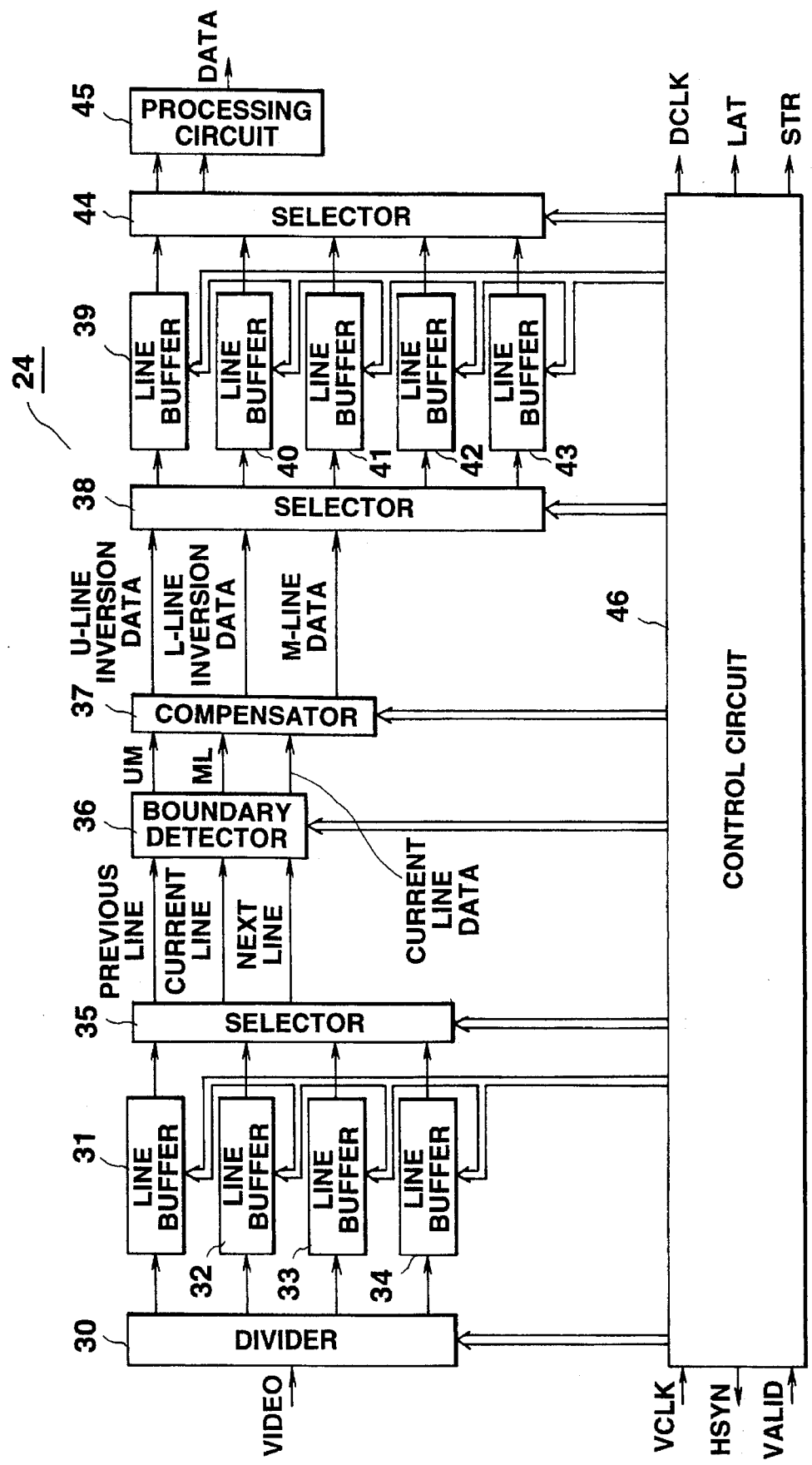
FIG. 1 is a circuit block diagram of an engine controller of a recording apparatus according to an embodiment of the present invention.

FIG. 1 presents a circuit block diagram for explaining the detailed structure of the engine controller 24. As illustrated, the engine controller 24 comprises a divider (multiplexer) 30, four line buffers 31 to 34 as line data storage means, a selector 35, a boundary detector 36, a compensator 37, a selector 38, line buffers 39 to 43, a selector 44, a processing circuit 45, and a control circuit 46.

The divider 30 receives the video signals VIDEO from the printer controller 23. The divider 30 outputs the video signals VIDEO to one of the four line buffers 31 to 34 line by line in accordance with control signals from the control circuit 46.

Each of the line buffers 31 to 34 has the same capacity, sequentially shifts serially-input video signals supplied from the divider 30 rightwards in FIG. 1, and holds one line of the video signals (video signals for one line printing).

The line buffers 31 to 34 output storage data in both ascending order and descending order of the addresses in accordance with control signals from the control circuit 46. Therefore, the line buffers 31 to 34 can output the dot data in the ascending order or descending order of the dot number in accordance with the control signals.

The selector 35 receives consecutive three lines of data from the line buffers 31 to 34 in accordance with control signals from the control circuit 46. For example, the selector 35 first selects data of the line buffer 31, 32 and 33, then selects data of the line buffers 32, 33 and 34 and then selects data of the line buffers 33, 34 and 31. The selector 35 outputs the consecutive three lines of data selected from the line buffers 31 to 34, as previous line data, current line data (target line data) and next line data, to the boundary detector 36.

Figure 13A:
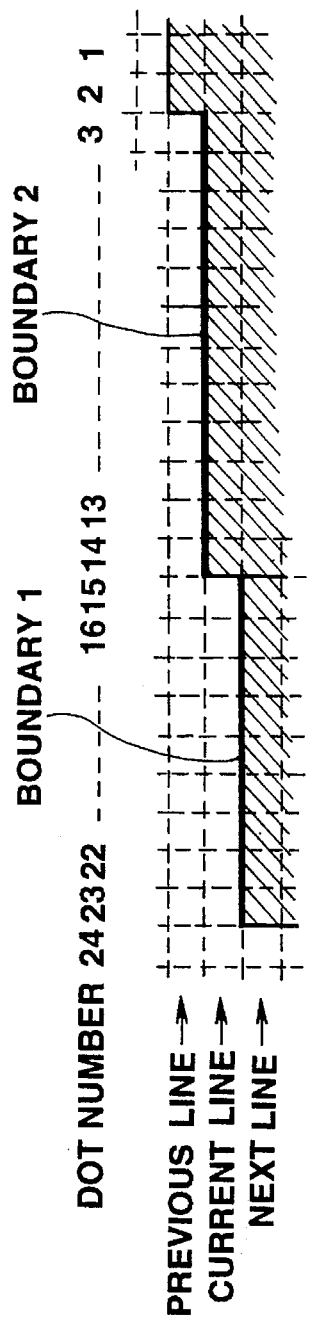
FIGS. 13A to 13H are diagrams exemplifying a case where a specific dot pattern is compensated.

The boundary detector 36 receives the video signals for three lines supplied from the selector 35, and detects a boundary of white and black dot between the current line and the previous or next line as shown in FIG. 13A, for example. To detect the boundary, the boundary detector 36 selects 3×3 dots data on the three lines in the predetermined order, and detects predetermined pattern as described later.

Figure 4:
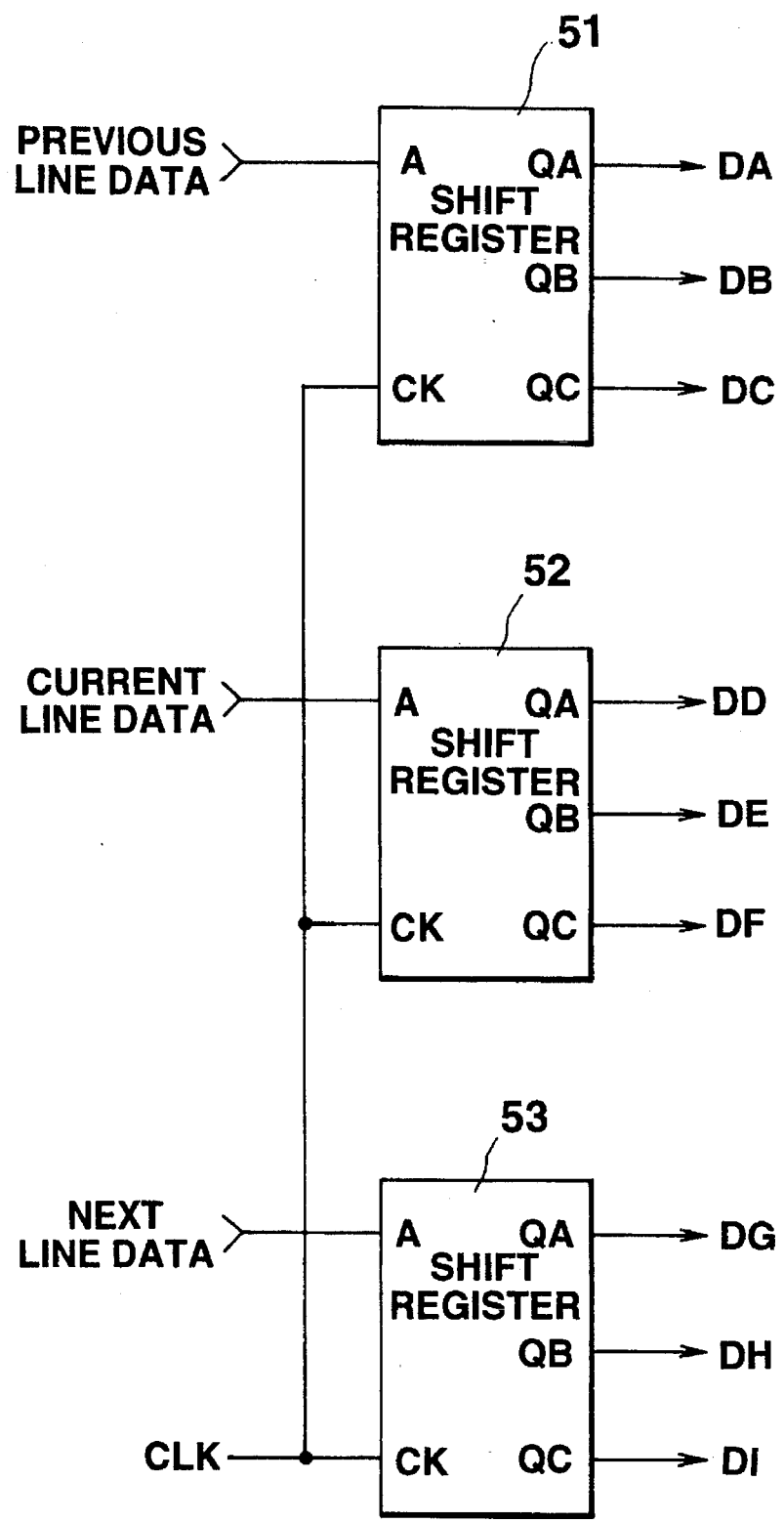
FIG. 4 is a circuit diagram of a boundary detector.
Figure 5:
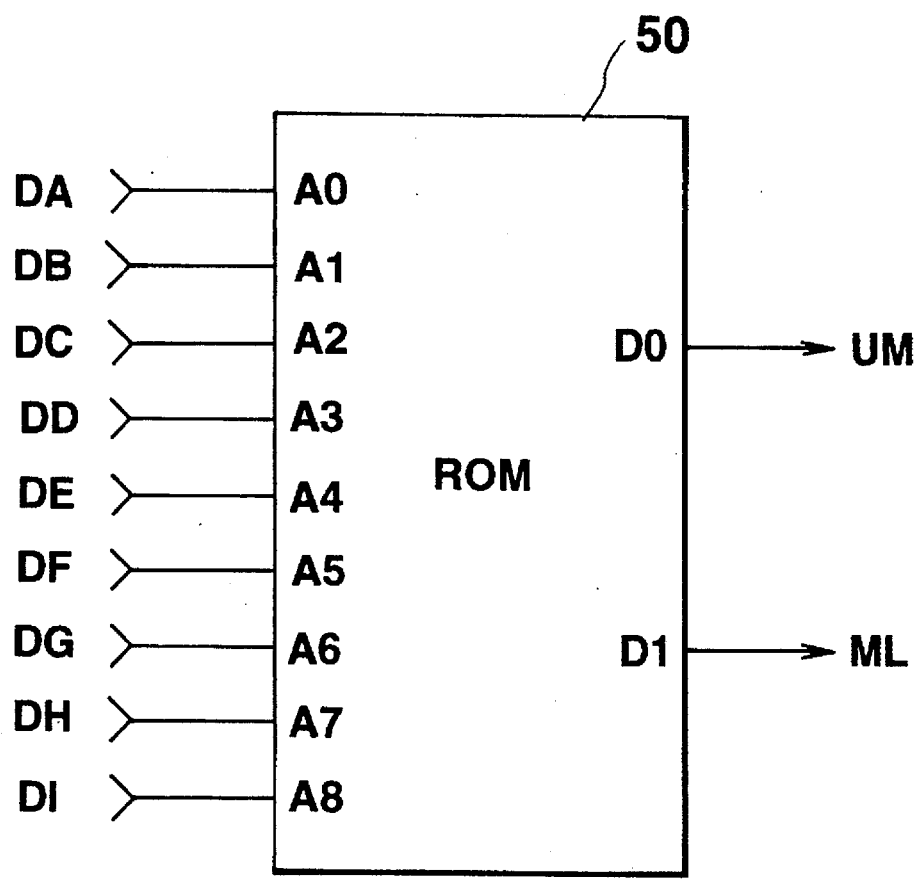
FIG. 5 is a circuit diagram of the boundary detector.

The boundary detector 36 is constituted of circuits shown in FIGS. 4 and 5. FIG. 4 shows a circuit having three shift registers 51 to 53 connected to the outputs of the selector 35. The shift register 51 receives the previous line data in synchronism with a clock signal CLK, and outputs three consecutive bits of dot data from its output terminals QA, QB and QC. For example, when most recently received three bits of dot data are "1," "1" and "1", the shift register 51 outputs data "1," "1" and "1" from the output terminals QA, QB and QC. When most recently received three consecutive pieces of dot data are "0," "0" and "1," the shift register 51 outputs data "0," "0" and "1" from the output terminals QA, QB and QC. Those signals are sent as outputs DA to DC to a ROM 50 shown in FIG. 5.

The shift register 52 sequentially receives the current line data and likewise sends the received data as outputs DD to DF to the ROM 50 from its output terminals QA to QC. The shift register 53 also sequentially receives dot data as the next line data and sends the received data as outputs DG to DI to the ROM 50 from its output terminals QA to QC.

The output data DA to DI from the shift registers 51 to 53 are supplied to associated input (address) terminals A0 to A8 of the ROM 50, respectively.

The ROM 50 is a circuit which detects the boundary, and prepares a UM signal and an ML signal in accordance with the input data DA to DI.

More specifically, dot data Da to Di of 9 (3×3) dots shown in FIGS. 6A to 6D show example of the input data DA to DI. In FIGS. 6A to 6D, the white portions mean data "0", the hatched portions mean data "1," and the portions indicated by the broken lines are undefined. When the pattern A-3, C-3, or D-3 is supplied to the ROM 50 while the line buffers 31 to 34 are outputting the dot data in the ascending order of the dot number, the ROM 50 outputs the ML signal. The ROM 50 maintains the ML signal while the pattern A-2, C-2, or D-2 is supplied thereto, the ROM 50 ends the ML signal when the pattern A-1, C-1, or D-1 is supplied thereto.

When the pattern B-1 or D-1 is supplied to the ROM 50 while the line buffers 31 to 34 are outputting the dot data in the descending order of the dot number, the ROM 50 outputs the UM signal. The ROM 50 maintains the UM signal while the pattern B-2 or D-2 is supplied thereto, the ROM 50 ends the UM signal when the pattern B-3 or D-3 is supplied thereto.

The patterns used by the ROM 50 for detecting the boundaries are not limited to the ones shown in FIGS. 6A to 6D. The patterns may be selected arbitrarily as need.

The compensator 37 performs a compensating process.

Figure 7:
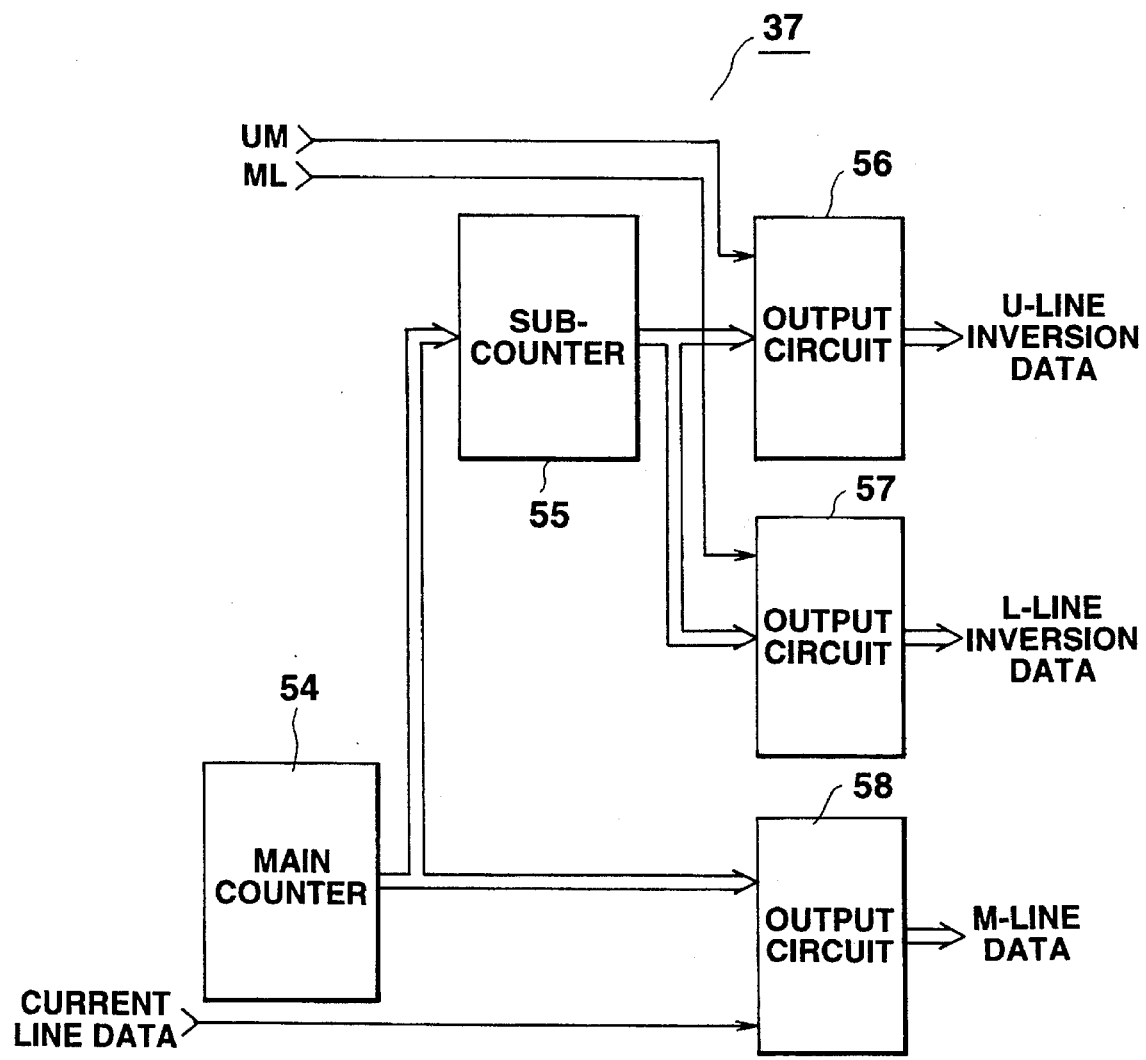
FIG. 7 is a circuit diagram of a compensator.

FIG. 7 presents a specific circuit diagram of the compensator 37 which performs the compensating process. The compensator 37 comprises a main counter 54, a presettable sub-counter 55 and output circuits 56 to 58. The main counter 54 counts up or down the dot number in accordance with a clock signal from the control circuit 46, and outputs count data (data of the dot number) to the output circuit 58 and the sub-counter 55.

The sub-counter 55 presets the count data of the main counter 54 as count data thereof when it receives the UM or ML signal from the ROM 50. Then the sub-counter 55 counts up or down the dot number in a ⅓ rate of that of the main counter 54, and sends the count data to the output circuits 56 and 57.

The output circuit 56 receives the UM signal and the count data of the sub-counter 55. The output circuit 56 outputs a U-line inversion data for inverting dot data of the current line data whose dot number is equal to the count data of the sub-counter 55 when the UM signal is being input to the output circuit 56.

The output circuit 57 receives the ML signal and the count data of the sub-counter 55. The output circuit 57 outputs a L- line inversion signal for inverting the dot data of the current line data whose dot number is equal to the count data of the sub-counter 55 when the ML signal is being input to the output circuit 57.

The output circuit 58 receives the current line data and the count data of the main counter 54, and outputs the current line data, dot numbers (outputs of the main counter 54), and control signals for controlling the line buffers 39 to 43.

FIGS. 8A to 8F are diagrams showing the compensation method of the present embodiment. In the method, one dot is divided into three in the sub-scanning direction into a U-line, an M-line and an L-line from the top as shown in FIG. 8A. When the ML signal is output, the L-line of data is inverted with respect to the M-line of data, i.e, original data, as shown in FIGS. 8B and 8E. When the UM signal is output, the U-line of data is inverted with respect to the M-line of data, as shown in FIGS. 8C and 8F.

When the UM signal is input, therefore, the output circuit 56 outputs the U-line inversion data to the selector 38. When the ML signal is input, therefore, the output circuit 57 outputs the L-line inversion data to the selector 38. The output circuit 58 sends the current line data, dot number data, etc. to the selector 38.

The selector 38 receives the U- and L-line inversion data, M-line data, dot numbers and so on supplied from the compensator 37, and supplies the received data to selected three of the line buffers 39 to 43.

The line buffers 39 to 43 have the same capacity and stores the U-line and L-line inversion data and the dot data of the M-line. Specifically, the line buffers 39 to 43 store "0" in the initial state, and store "1" for the dot to be inverted in response to the U- and L-line inversion data. The line buffers 39 to 43 store "1" for the black dot and "0" for the white dot in response to the M-line data.

When data supplied from the selector 38 are written in three of the line buffers 39 to 43 selected by the selector 38.

The selector 44 selects two lines of data or one line of data stored in the line buffers 39 to 43 under the control of the control circuit 46.

Figure 9:
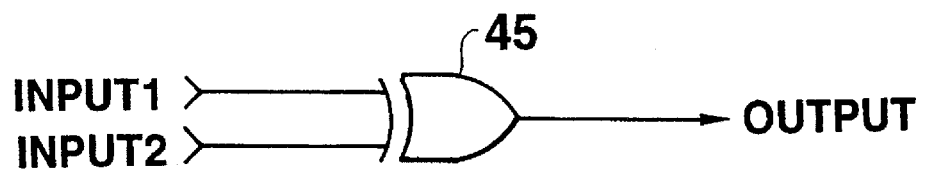
FIG. 9A is a circuit diagram of a processing circuit.
FIG. 9B is a truth table of the circuit shown in FIG. 9A.

The processing circuit 45 comprises an exclusive OR gate as shown in FIG. 9A and its output is supplied to the LED head 5. As shown in FIG. 9B, when either an input 1 or an input 2 of the processing circuit 45 is data of "1," the output of the processing circuit 45 becomes "1" while when both the inputs 1 and 2 are "1" or "0," the output of the processing circuit 45 becomes "0."

To output the M-line data to the LED head 5, the selector 44 selects and supplies the M-line data stored in one of the line buffers 39 to 43 to the input 1 of the processing circuit 45, and supplies "0" to the input 2. In this case, the M-line data is output as it is.

To output the U-line data to the LED head 5, the selector 44 selects and supplies the U-line inversion data stored in one of the line buffers 39 to 43 to the input 1, and the M-line data stored in another of the line buffers 39 to 43. The processing circuit 45 obtains an exclusive OR of the corresponding two bits of the U-line inversion data and M-line data, then outputs the obtained data as the U-line data. Therefore, when the U-line inversion data is "1", the M-line data is inverted as shown in FIGS. 8B and 8E.

To output the L-line data to the LED head 5, the selector 44 selects and supplies the L-line inversion data stored in one of the line buffers 39 to 43 to the input 1, and the M-line data stored in another of the line buffers 39 to 43. The processing circuit 45 obtains an exclusive OR of the corresponding two bits of the L-line inversion data and M-line data, then outputs the obtained data as the L-line data. Therefore, when the L-line inversion data is "1", the M-line data is inverted as shown in FIGS. 8C and 8F.

The control circuit 46 receives the signals VCLK and VALID from the printer controller 23, outputs the horizontal sync signal HSYN to the printer controller 23, outputs the signals DCLK, LAT, STR to the LED head 5, and outputs control signals to the aforementioned divider 30, the line buffers 31 to 34 and 39 to 43, the selectors 35, 38 and 44, the boundary detector 36 and the compensator 37.

Figure 10:
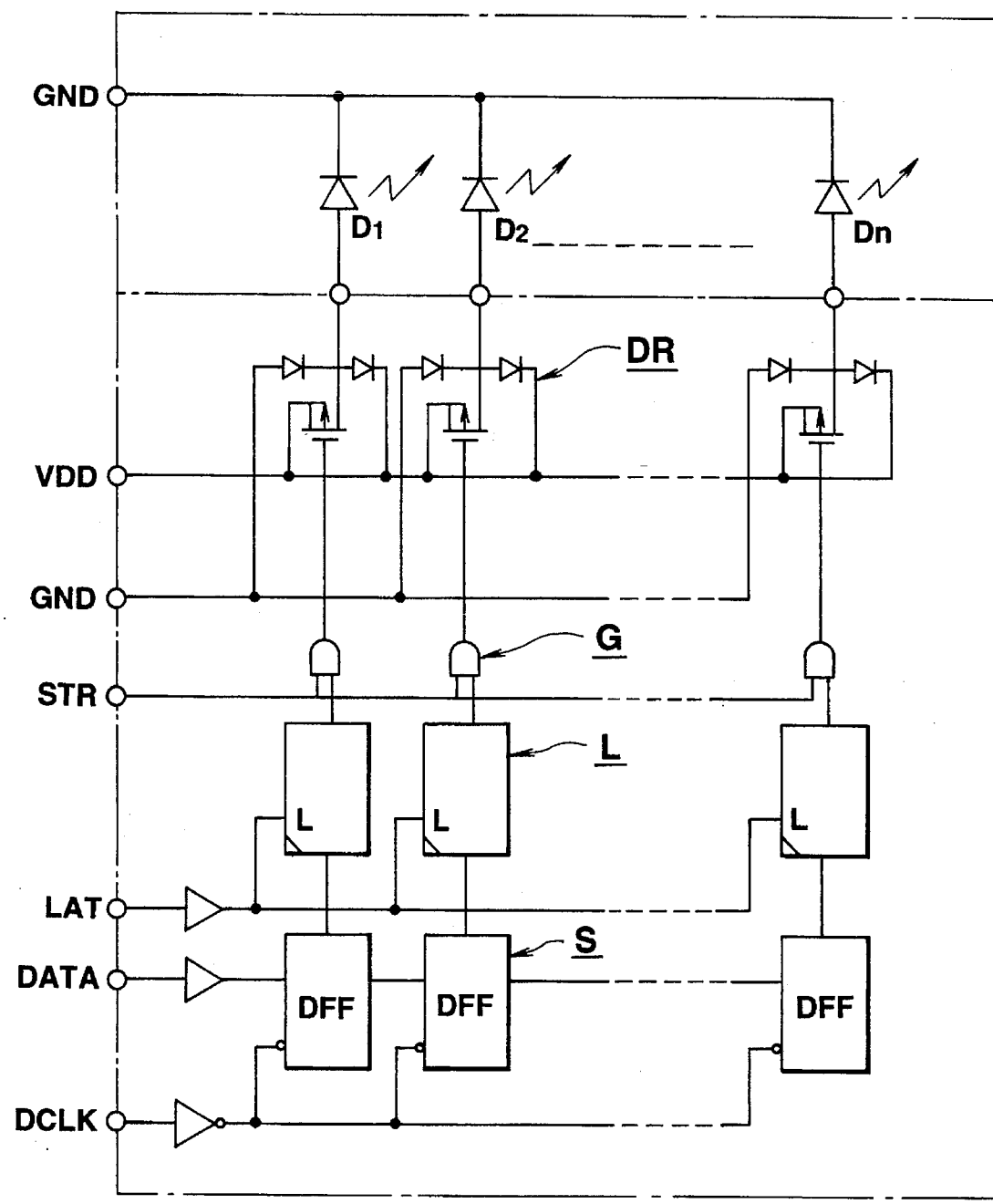
FIG. 10 is a circuit diagram showing an example of an LED element driving circuit.

FIG. 10 shows an example of an LED element driving circuit provided in the LED head 5.

The illustrated driving circuit comprises a shift register S formed by D type flip-flops, latches L, gate circuits G, and drivers DR, with the LED elements D1 to Dn connected to the outputs of the associated drivers DR. Data from the processing circuit 45 is input to the shift register S in synchronism with the clock signal DCLK supplied from the controller 46 and is serially shifted in the shift register S in order and is held there.

When one line of data are all input to the shift register S, the data held in the shift register S is latched in the latches L in synchronism with the latch signal LAT supplied from the controller 46.

The data latched in the latches L is input to one input terminal of the associated gate circuit G whose other input terminal is supplied with the strobe signal STR that determines the light emission time (activation time) of the associated LEDs D1 to Dn. Each gate circuit G outputs a gate signal to the associated driver DR in accordance with the value of the received processed data. While receiving the gate signal, each driver DR selectively supplies a drive current to the LEDs D1 to Dn, which should be activated, so that the LEDs D1 to Dn will luminesce.

The printing operation of the thus constituted LED printer will now be described.

FIGS. 11A to 11R are the time charts for explaining the printing operation that is executed by the printer according to the present embodiment. FIGS. 12A to 12R are time charts following to the time charts shown in FIG. 11A to 11R, respectively.

When a horizontal sync signal HSYN shown in FIGS. 11A and 12A is output to the printer controller 23 from the engine controller 24 (control circuit 46), a write valid signal VALID is output to the engine controller 24 from the printer controller 23. Thereafter, first line of video signals VIDEO shown in FIGS. 11C and 12C is output to the divider 30 from the frame memory in the printer controller 23. The video signals VIDEO are output to the divider 30 piece by piece in synchronism with a clock signal VCLK shown in FIGS. 11B and 12B.

The divider 30 first selects the line buffer 31 in response to a control signal from the control circuit 46. As a result, the first line of the video signals VIDEO supplied to the engine controller 24 is input to the line buffer 31. When a predetermined time (write period TW) elapses, the next horizontal sync signal HSYN is output.

When the next horizontal sync signal is output to the printer controller 23, the second line of the video signals VIDEO is output to the divider 30. At this time, the divider 30 selects the line buffer 32 in response to the control signal from the control circuit 46. As a result, the second line of video signals is input to the line buffer 32.

Thereafter, a similar process is sequentially repeated, and every time one line of the video signals is output from the printer controller 23, the divider 30 switches the line buffer to be selected, from 32 to 33 to 34 to 31 to 32 again and so forth. Three consecutive lines of video signals are held in the selected line buffers 31 to 34.

Now suppose that, as indicated by (1) in FIGS. 11D to 11G, video signals VIDEO of a new line n are being written in the line buffer 34, the video signals of a line n-1 are held in the line buffer 33, the video signals of a line n-2 are held in the line buffer 32, and the video signals of a line n-3 are held in the line buffer 31.

Under the situation, the selector 35 outputs the video signals of the line n-3, held in the line buffer 31, as the previous line data to the shift register 51 in the boundary detector 36; outputs the video signals of the line n-2, held in the line buffer 32, as the current line data to the shift register 52; and outputs the video signals of the line n-1, held in the line buffer 33, as the next line data to the shift register 53.

Each of the line buffers 31 to 34 selected by the selector 35 outputs the storage signal in the ascending order of the dot number in the first TW/3 period, and then, outputs the storage signal in the descending order of the dot number in the second TW/3 period in accordance with the control signals supplied from the control circuit 46.

The boundary detector 36 detects the boundary on the current line based on the supplied video signals of the three lines, and outputs the UM signal, ML signal, and the current line data of the line n-2 of the video signals. The compensator 37 outputs the U-line inversion data of the line n-2 of the video signals, the L-line inversion data of the line n-2 of the video signals, and the M-line data of the line n-2 of the video signals.

The selector 38 outputs the U-line inversion data to the line buffer 39, the M-line data to the line buffer 40, and the L-line inversion data to the line buffer 41 as shown in FIGS. 11H to 11J. Note that the U-line inversion data, L-line inversion data, and M-line data of the line n, for example, are indicated by reference symbols "(n) U-i," "(n) L-i," and "(n) m" in FIGS. 11H to 11O and 12H to 12O.

The data-output operation of the selector 38 completes in 2TW/3 period as shown in FIGS. 11H to 11J.

While the selector 38 is outputting the data to the line buffers 39 to 41, the selector 44 selects the line buffer 42 and supplies the storage data of the line buffer 42 to the input 1 and supplies data of "0" to the input 2 of the processing circuit 45, for TW/3 period as shown in FIGS. 11H to 11N.

Then the selector 44 selects line buffers 42 and 43, and supplies the storage data of the line buffers 42 and 43 to the input 1 and input 2 for next TW/3 period. Further, during TW/3 period after the completion of the outputting operation of the selector 38, the selector 44 supplies the data stored in the line buffers 39 and 40 to the input 1 and input 2 as shown in FIGS. 12H to 12N.

The processing circuit 45 obtains the exclusive-OR of the input 1 and input 2, and outputs the obtained data (i.e., the U-line data, M-Line data, or L-line data, each for TW/3 period) in synchronism with the clock signal DCLK shown in FIG. 11O. The output data of the processing circuit 45 is input to the shift register S of the LED head 5 in response to the clock signal DCLK shown in FIG. 11P, and then latched by the latch L in response to the latch signal LAT shown in FIG. 11Q. The LED head 5 exposes the photosensitive drum 4 during TW/3 period in accordance with the strobe signal STR and the latched data.

When next horizontal sync signal HSYN and the video signals VIDEO of the line n+1 are output, the video signals VIDEO of the line n+1 is written in the line buffer 31, and the line buffers 32 to 34 maintain the video signals VIDEO of the lines n-2, n-1, and n, respectively as indicated by (2) in FIGS. 11D to 11G. Under the situation (2), the selector 35 selects the three line buffers 32 to 34 whose data are not being rewritten, and outputs the video signals held in the line buffers 32–34 as the previous line data, current line data and next line data, respectively, to the shift registers 51 to 53 constituting the boundary detector 36.

The boundary detector 36 detects the boundary on the current line based on the supplied video signals of the three lines, and outputs the UM signal, ML signal, and current line data of the line n-1 of the video signals. The compensator 37 outputs the U-line inversion data, L-line inversion data, and M-line data of the line n-1 of the video signals.

The selector 38 outputs the U-line inversion data to the line buffer 42, the M-line data to the line buffer 43, and the L-line inversion data to the line buffer 39 as shown in FIGS. 11H to 11J.

While the selector 38 is outputting the data to the line buffers 42, 43 and 39, the selector 44 selects the line buffer 40 and supplies the storage data of the line buffer 40 to the input 1 and supplies data of "0" to the input 2 for TW/3 period as shown in FIGS. 11H to 11N. Then the selector 44 selects line buffers 40 and 41, and supplies the storage data of the line buffers 40 and 42 to the input 1 and input 2 for next TW/3 period. Further, during TW/3 period after the selector 38 finishes the output of data, the selector 44 supplies the data stored in the line buffers 42 and 43 to the input 1 and input 2 as shown in FIGS. 11H to 11N.

The processing circuit 45 obtains the exclusive-OR of the input 1 and input 2, and outputs the obtained data as shown in FIG. 11O. The output data of the processing circuit 45 is input to the LED head 5 in response to the clock signal DCLK shown in FIG. 11P, and then latched by the latch L in response to the latch signal LAT shown in FIG. 11Q. The LED head 5 exposes the photosensitive drum 4 during TW/3 period in accordance with the strobe signal STR and the latched data.

The similar processing is repeated every horizontal sync period as shown in FIGS. 12A to 12R, thereby forming a latent dot image on the photosensitive drum 4, line by line.

The operation of the boundary detector 36 and the compensator 37 and the compensation process will now be described with reference to a specific printing image shown in FIGS. 13A to 13H and the time charts shown in FIGS. 14A to 15F. In FIGS. 13A to 13H, the hatched dots are black print dots while white dots are white print dots. Through the above-described processing, the shift registers 51 to 53 are each now holding consecutive three lines of data each line data consisting of three dots.

Figure 13B:
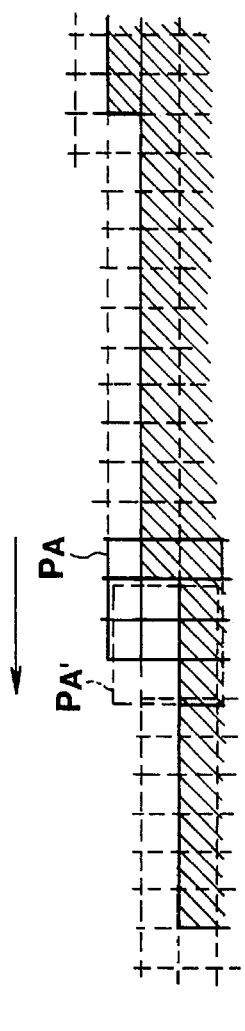
Figure 13C:
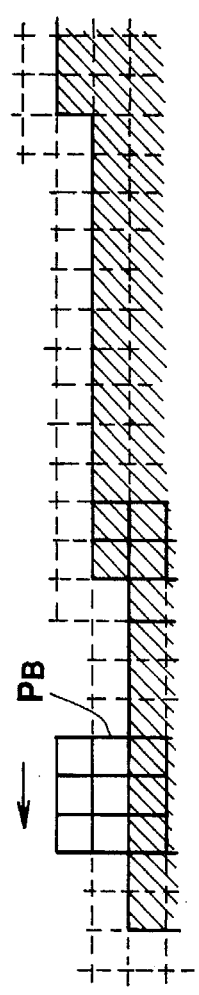

Suppose 9-dots data indicated by a portion PA in FIG. 13B are held in the shift registers 51 to 53 while the video signals stored in selected three line buffers 31 to 34 are being read out in the ascending order of the dot number.

Figures 14A, 14B, 14C, 14D, 14E, 14F:
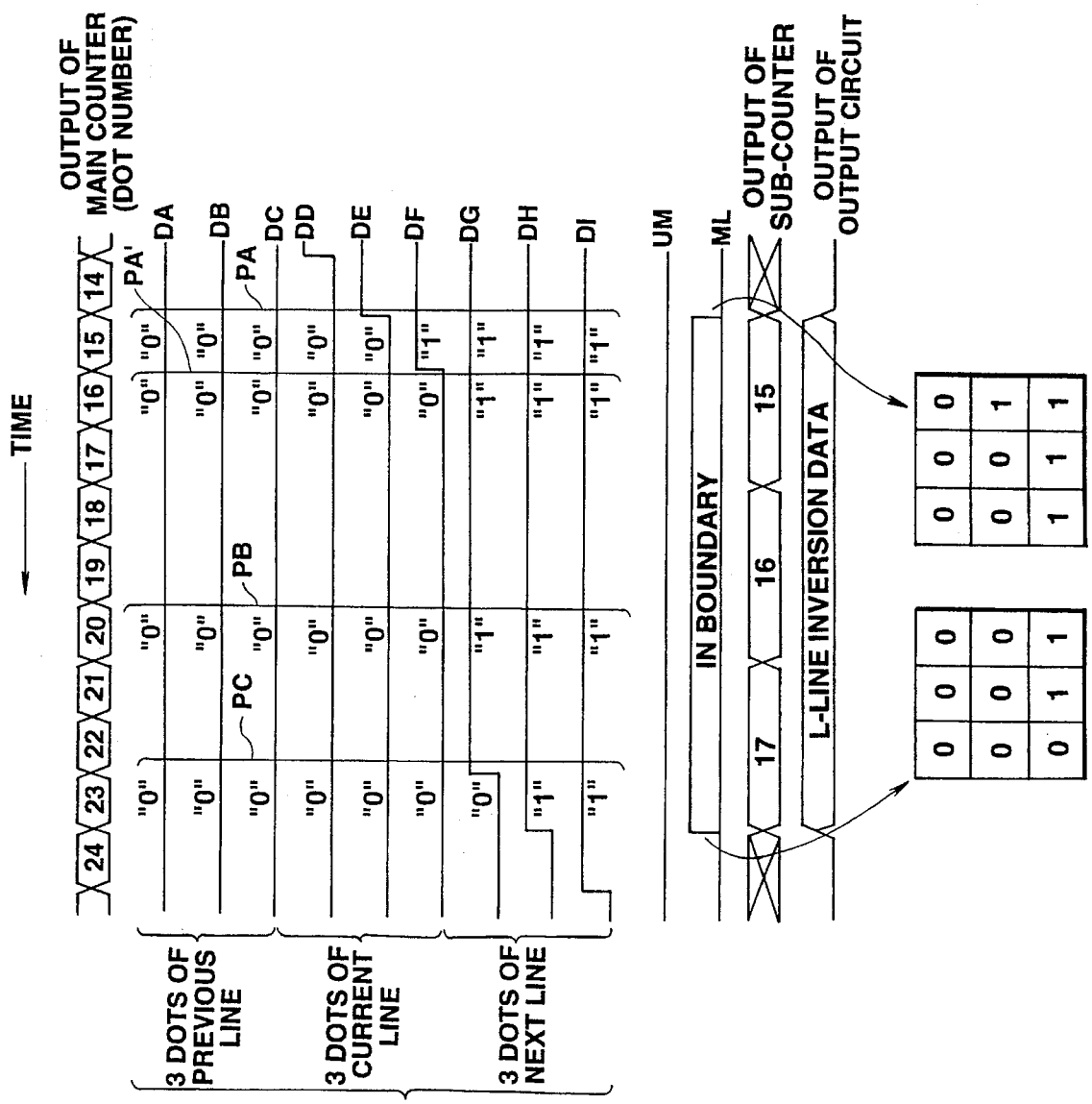
FIGS. 14A to 14F are time charts for explaining the case where the specific dot pattern is compensated.

In this case, the data DA to DI which are to be output to the ROM 50 from the shift registers 51 to 53 are data of "0" for the outputs DA to DE and data of "1" for the outputs DF to DI as shown in FIG. 14B. This output data corresponds to a dot pattern (C-3) shown in FIG. 6C. Therefore, the ROM 50 turns the ML signal at a high level when the main counter 54 outputs count data of "15" as shown in FIGS. 14A to 14D. The sub-counter 55 sets the count data "15" of the main counter 54 as its count data, and then starts the counting-up. The sub-counter 55 counts-up by one while the main counter 54 counts-up by three as shown in FIGS. 14A and 14E. In response to the ML signal, the output circuit 57 outputs the L-line inversion data as shown in FIG. 14F.

When the 3-dot data to be held in the shift registers 51 to 53 are shifted in the dot-number advancing direction (in the arrowhead direction in FIG. 13B) by one dot in synchronism with the clock signal, the shift registers 51 to 53 output "000000111" as the data DA to DI corresponding to a portion PA' in FIG. 13B, as shown in FIG. 14B. This pattern corresponds to the dot pattern (C-2) shown in FIG. 6C. The ROM 50 maintains the ML signal at the high level, and the output circuit 57 maintains the L-line inversion data as shown in FIGS. 14D and 14F.

Thereafter, the dot data are sequentially shifted in the arrowhead direction in synchronism with the clock signal, so that the status of a portion PB, which is equal to the portion PA', continues. The ML signal maintains the high level and the sub-counter 55 counts-up in a ⅓ rate of that of the main counter 54 as shown in FIGS. 14A to 14E.

Figure 13D:
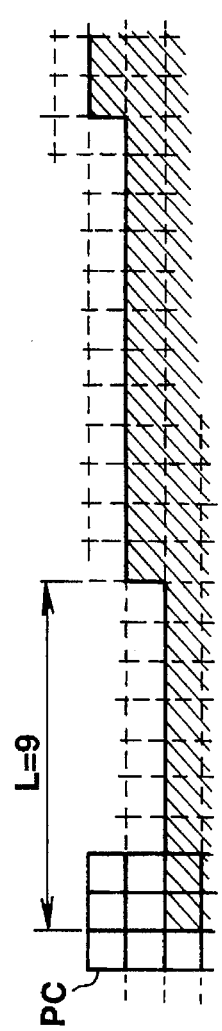

When the dot data are further shifted dot by dot in the arrowhead direction in synchronism with the clock signal, the status becomes the one indicated by the portion PC in FIG. 13D. The data DA to DI at this time are "000000011" as shown in FIG. 14B and equivalent to a status (C-1) in FIG. 6C. The ROM 50 makes the ML signal at a low level in response to next clock signal as shown in FIGS. 14A to 14D.

Figure 13E:
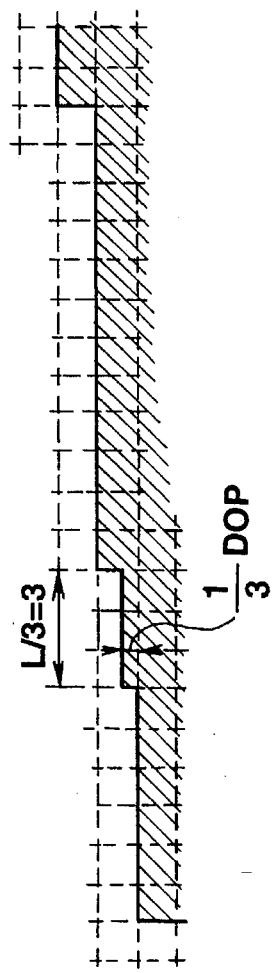

As stated above, while the dot pattern changes from the status (C-3) of the portion PA to the status (C-1) of the portion PC through the status (C-2) of the portion PB, the ML signal of the high level is output to the compensator 37 and the count data of the sub-counter 55 changes "15" through "17". Therefore, the output circuit 57 outputs to the selector 38 the L-line inversion data of "1" for inverting L-line data for the three dots of dot numbers "15" to "17". Suppose that the line buffer 39 is selected to hold the L-line inversion data of the current line by the selector 38 (in this case, the U-line inversion data is held in the line buffer 42, and the M-line data is held in the line buffer 43). The selector 44 reads data from the line buffers 43 and 39 to be processed by the processing circuit 45. In this case, the M-line data (same as the current line data) is "0" corresponding to the dot numbers "15" to "17" and the L-line inversion data in the line buffer 39 corresponding to the dot numbers "15" to "17" are set to "1", the L-line data corresponding to the dot numbers "15" to "17" output from the processing circuit 45 becomes "1." In other words, dots of the current line of the dot numbers "15" to "17" are white, and through the compensation process, black printing will be performed on the L-line of three dots of the dot numbers "15" to "17", which are ⅓ of the length L of the boundary 2, as shown in FIG. 13E.

Figure 13F:
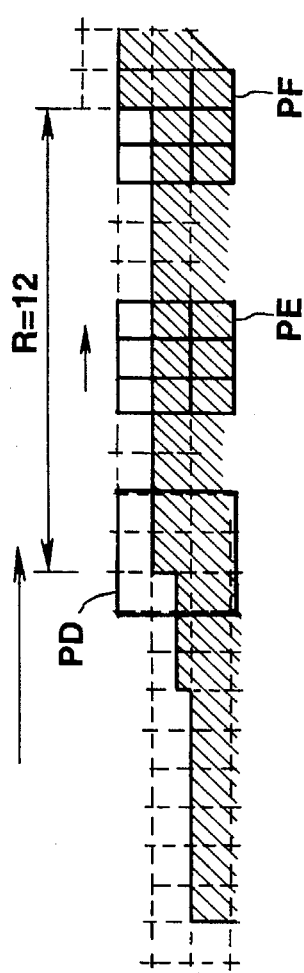

After all of the dot pattern shown in FIG. 13A are read out in the above-described manner, then, the dots are shifted in the opposite direction as indicated by the arrow in FIG. 13F. When the dots are shifted in the opposite direction, the status of the shift registers 51 to 53 becomes the status of a portion PD shown in FIG. 13F. The data DA to DI supplied to the ROM 50 is "000110111" as shown in FIG. 15B and equivalent to a status (B-1) in FIG. 6B. (The reason why the dot positions and dot numbers shown in FIG. 6C do not match with those in FIG. 6B is that the data reading directions are opposite to each other.)

Therefore, the ROM 50 turns the UM signal at a high level when the main counter 54 outputs count data of "14" as shown in FIGS. 15A to 15F. The sub-counter 55 sets the count data "14" of the main counter 54 as its count data, and then starts the counting-down. In response to the UM signal, the output circuit 57 outputs the U-line inversion data.

When the dot data are further shifted dot by dot in the arrowhead direction in synchronism with the clock signal, the status indicated by a portion PE in FIG. 13F continues, the UM signal maintains the high level, and the sub-counter 55 counts-down at a ⅓ rate of that of the main counter 54 as shown in FIGS. 15A to 15D.

Figure 6A:
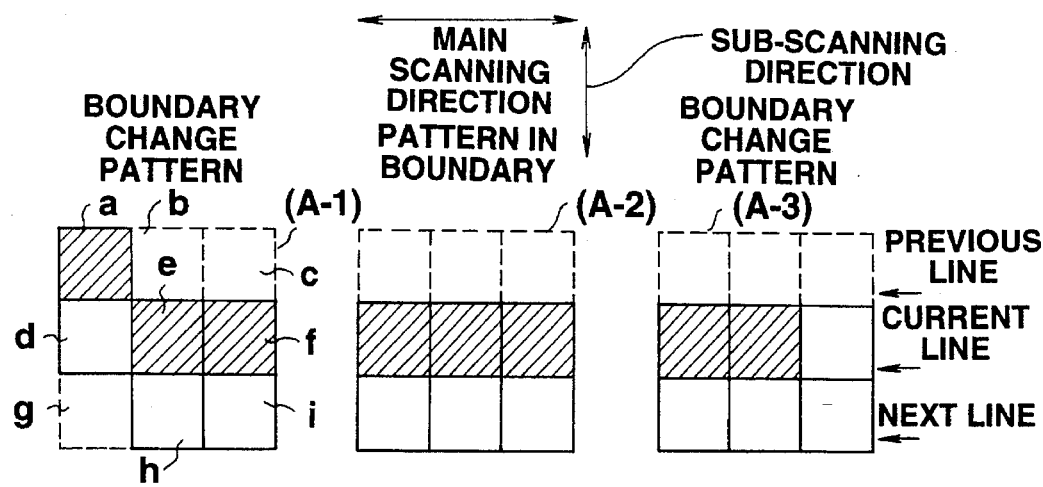
FIGS. 6A to 6D show pattern examples used for detecting a boundary in the image to be printed.
Figure 6B:
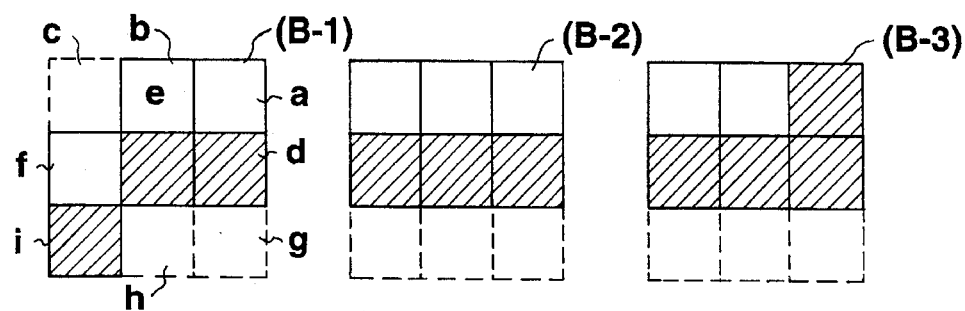
Figure 6C:
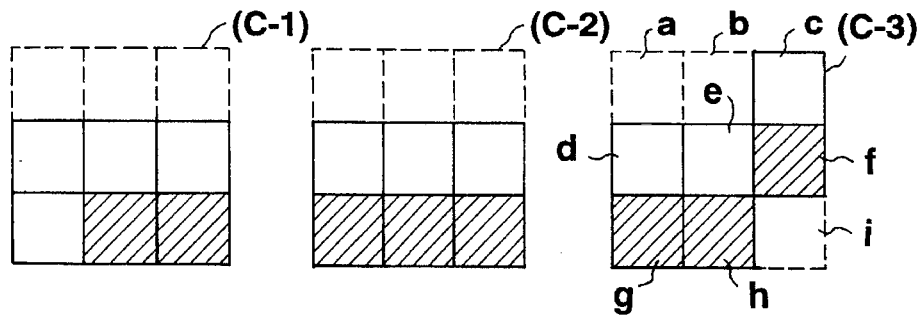
Figure 6D:
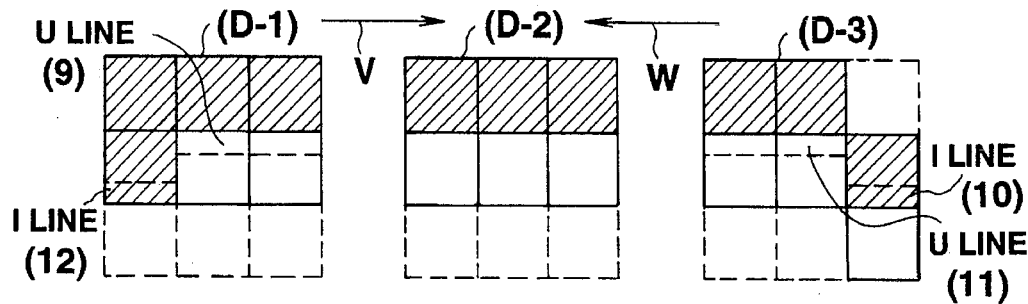

When the dot data becomes the one indicated by a portion PF in FIG. 13F, the data DA to DI become "100111111" equivalent to a status (B-3) in FIG. 6B. The ROM 50 makes the UM signal at a low level in response to the next clock as shown in FIGS. 15A to 15C.

Figure 13G:
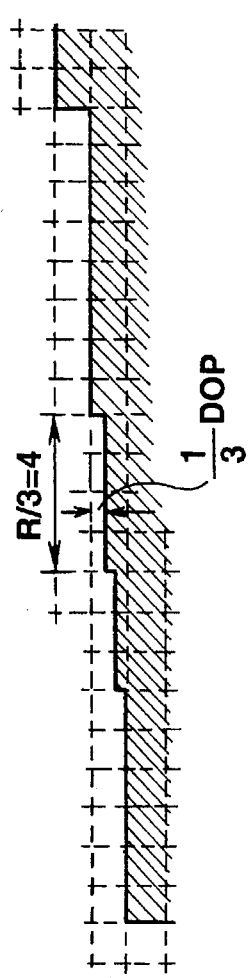

As explained above, while the dot pattern changes to the status (B-3) from the status (B-1) through the status (B-2) shown in FIG. 6B, the UM signal is output to the compensator 37 (output circuit 56). The output circuit 57 outputs to the selector 38 a U-line inversion data of the current line for inverting the four dots of dot numbers "14" to "11". If the line buffer 42 holds the U-line inversion data (the M-line data of the current line data is held in the line buffer 43, and the L-line data is held in the line buffer 39 at this time), for example, the selector 44 outputs data from the line buffers 42 and 43. As the current line data corresponding to the dot numbers "14" to "11" in the line buffer 43 is "1" and the U-line inversion data in the line buffer 42 corresponding to the dot numbers "14" to "11" is "1", the output of the processing circuit 45 becomes "0." In other words, dots of the current line of the dot numbers "14" to "11" are black, and through the compensation process, white printing will be performed on U-line of the four dots of the dot numbers "14" to "11" which are ⅓ of the length R of the boundary 1 as shown in FIG. 13G.

Figure 16:
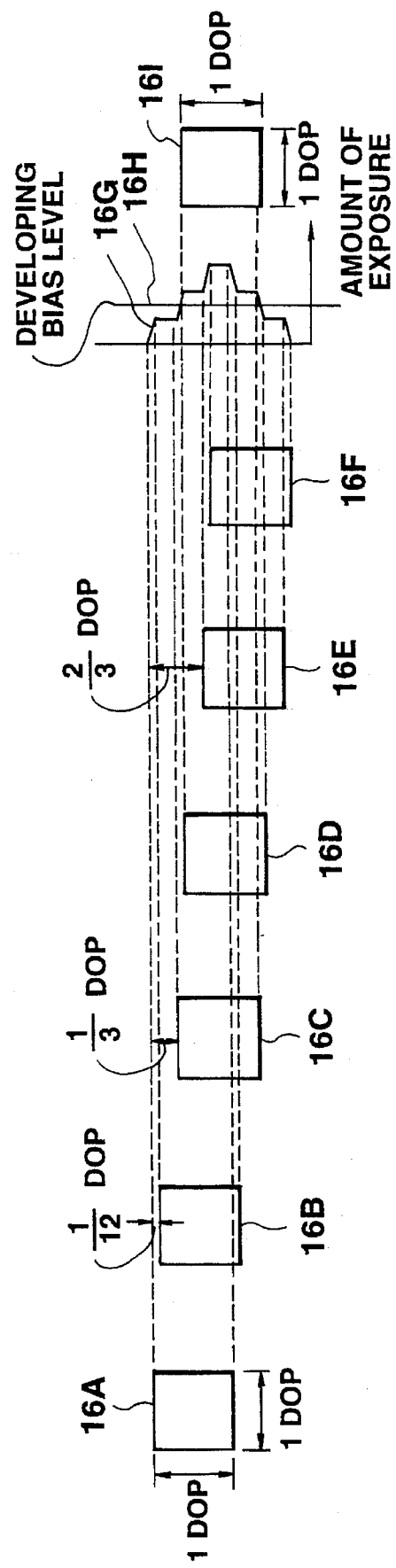
FIG. 16 is a diagram showing an example of a one-dot printing process executed by the recording apparatus according to the embodiment.

FIG. 16 shows the relation between the amount of exposure and the dot size at the time the LED head 5 is driven to print data based on the compensation data DATA output from the processing circuit 45. Since the conventional one-dot forming process is trisected with respect to the sub-scanning direction in this embodiment, exposure from the LED head 5 is also carried out in three divided processes. More specifically, the write period TW is divided into three sub-periods, and an exposure process (where the strobe signal STR is output) based on the compensation data DATA is executed in the first quarter of each sub-period (i.e., ¹⁄₁₂ of the write period TW). In the example in FIG. 16, data of the U-, M- and L-lines are all "1." In this case, the LED head 5 performs three exposures for the U-, M- and L-lines on the photosensitive drum 4, which moves in the sub-scanning direction. The exposure for the U-line starts at an area 16A and ends at an area 16B, the exposure for the M-line starts at an area 16C and ends at an area 16D, and the exposure for the L-line starts at an area 16E and ends at an area 16F.

In FIG. 16, the exposed areas 16A to 16F are sifted in the main scanning direction for explanation. However, the exposed areas 16A to 16F exist on a straight line extending in the sub-scanning direction on the photosensitive drum 4.

Every time the exposure is performed, the charges previous charged are removed from the photosensitive drum 4, an electrostatic latent image with a different charge level 16G is formed thereon. The developing unit 11 applies a predetermined developing bias voltage 16H to the drum 4 to form an image of one dot. By properly setting the developing bias voltage 16H, it is possible to form a dot 16I with the same width as the one in the main scanning direction.

Figure 17:
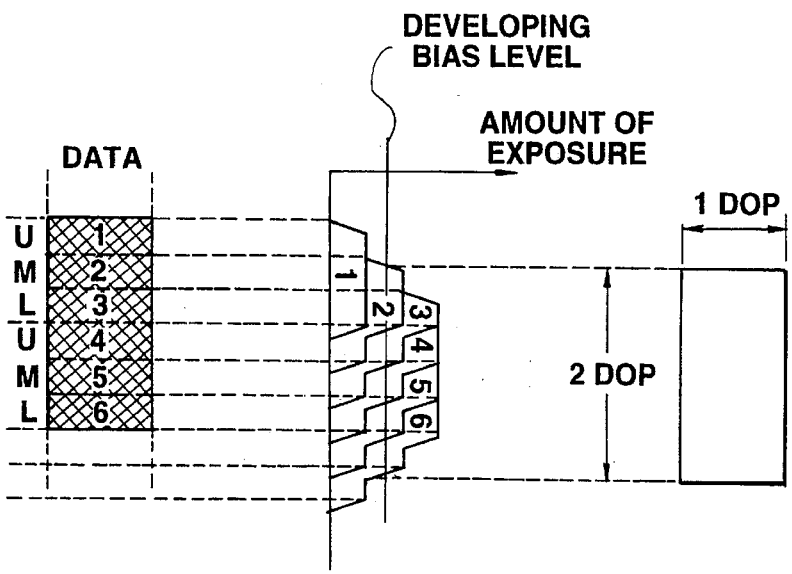
FIGS. 17A to 17C are diagrams showing examples of a 2-dot printing process, 5/3-dot printing process and 4/3-dot printing process, respectively, which are executed by the recording apparatus according to the embodiment.
Figure 17:
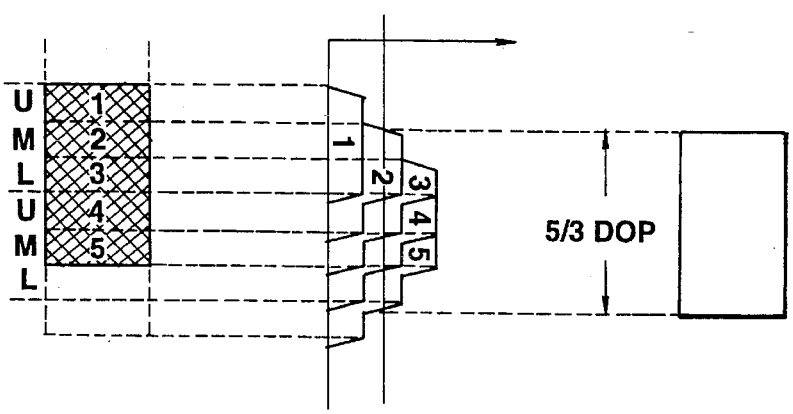
Figure 17:
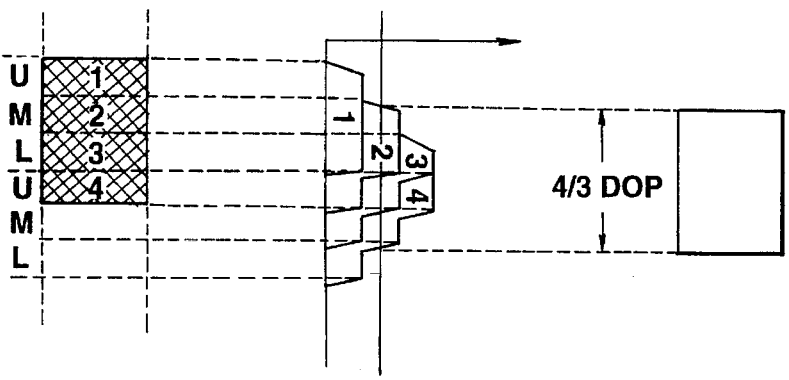

FIG. 17A exemplifies the cases where printing of two dots based on the compensation data DATA is carried out.

FIG. 17B exemplify the case a 5/3 dot is printed, while in the case of FIG. 17C, a 4/3 dot is printed.

Figure 13H:
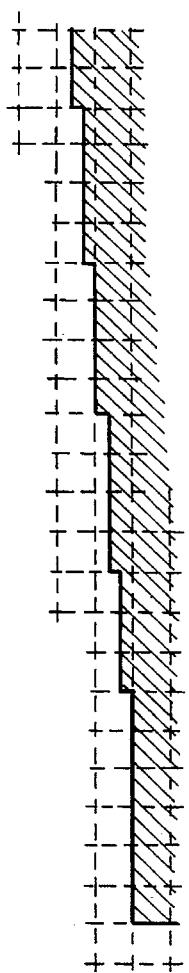

As described above, the dot pattern data of the current line is divided to data of the U-line, M-line and L-line in the sub-scanning direction, and when the dot pattern data includes steps, the U-line or L-line data is compensated. Consequently, the oblique line can be printed smoothly, for example, as shown in FIG. 13H.

This invention is not limited to the example of FIG. 13A, but may well be adapted for other dot patterns having the steps and the boundaries. For instance, in the case of FIG. 6D, as dots are shifted in the direction of an arrow V, black printing is carried out on the portion of the current line data corresponding to the U-line (portion (9) at the ⅓ of dots to the next step). Further, white printing is carried out on the portion of the current line data corresponding to the L-line (portion (10) at the ⅓ of dots to the next step). As dots are shifted in the opposite direction of an arrow W, black printing is carried out on the portion of the current line data corresponding to the U-line (portion (11) at the ⅓ of dots to the next step), while white printing is carried out on the portion of the current line data corresponding to the L-line (portion (12) at the ⅓ of dots to the next step). Unlike the prior art where printing is carried out dot by dot, this embodiment performs compensation in such a way that one dot of the current line is divided into three parts in the sub-scanning direction so that a step portion of a dot pattern would change naturally. This will increase the resolution of the recording apparatus and improve the printing quality.

Figure 18A:
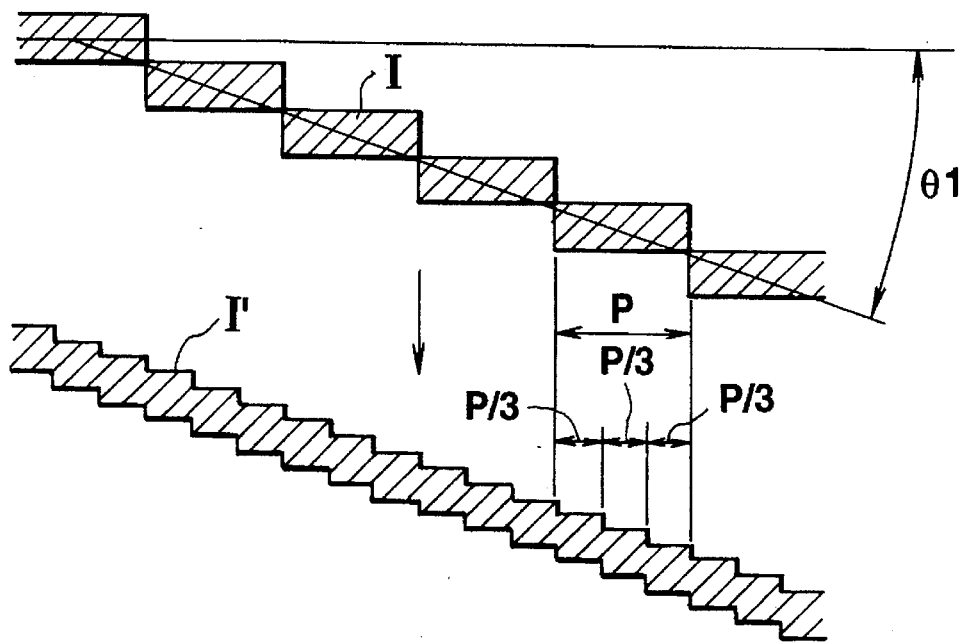
FIGS. 18A and 18B are diagrams for explaining the compensation to be executed with respect to oblique lines I and II with angles θ1 and θ2.

An oblique line I as shown in FIG. 18A may be processed similarly. FIG. 18A shows an example where the oblique line I with an angle θ1, which is an example of a conventional printout, is subjected to the above-described compensation process to yield an oblique line I'. It is apparent that the oblique line I' looks far better than the oblique line I. In other words, many lines (dots) of a length P in the main scanning direction, which form the oblique line I, are provided with steps every P/3 length as shown in FIG. 18A, providing the considerably natural or smooth oblique line I'.

Figure 18B:
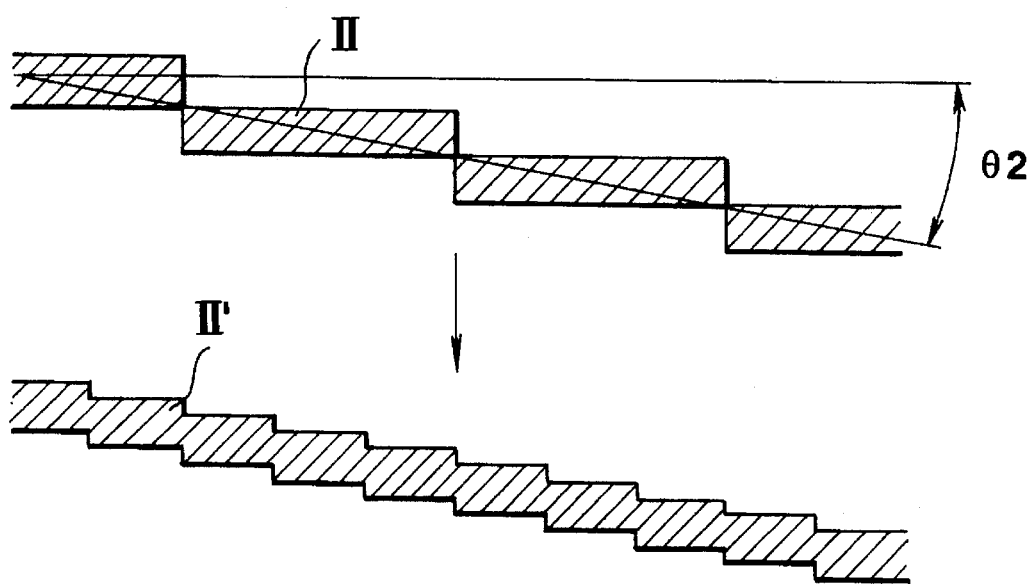

FIG. 18B shows an example where the oblique line II with an angle θ2 is subjected to the above-described compensation process to yield an oblique line II'. The oblique line II' clearly appears far better than the oblique line II.

The foregoing description of this embodiment has been given with reference to the case where data "1" is for black printing and data "0" for white printing, and exposure is carried out by the LED head 5 for the data "1" to accomplish printing with a negative developing system. The present invention may be designed in such a manner that exposure is carried out for the data "0" to accomplish printing with a positive developing system.

Figure 19A:
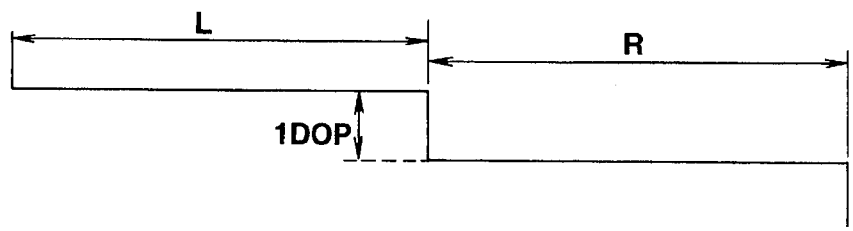
FIGS. 19A to 19E are diagrams for explaining statuses of a step portion when the compensation for that step portion is changed to ⅓, ¼, ⅕, and ⅙, respectively.
Figure 19B:
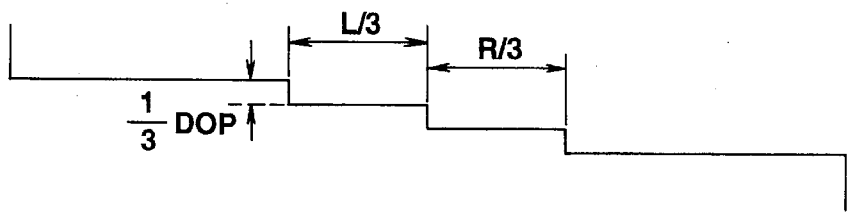
Figure 19C:
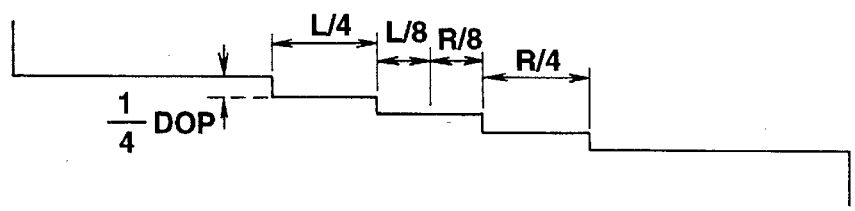
Figure 19D:
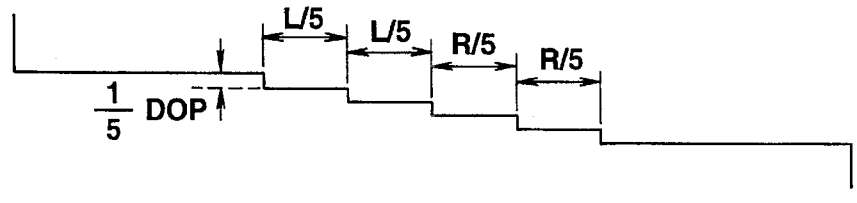
Figure 19E:
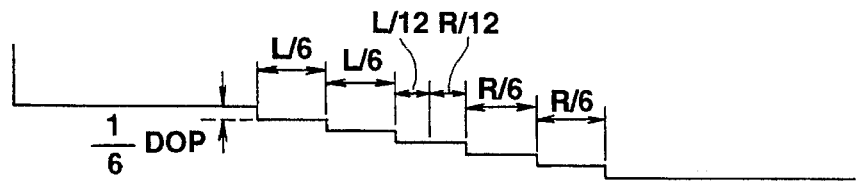

Although this embodiment uses four line buffers 31 to 34 are used to divide one dot into three parts in the sub-scanning direction and performs printing accordingly, more line buffers may be used to increase the number of divided dot lines. FIGS. 19A to 19E show examples of such a case. The above-described embodiment divides an oblique line having a step of one dot (DOP) as shown in FIG. 19A by three to improve the printing resolution by a factor of three as shown in FIG. 19B. But, this embodiment may be modified to divide such an oblique line by four to improve the printing resolution by a factor of four as shown in FIG. 19C. Further, the embodiment may be modified to divide such an oblique line by five to improve the printing resolution by a factor of five as shown in FIG. 19D, or to divide the oblique line by six to improve the printing resolution by a factor of six as shown in FIG. 19E. In other words, printing will be accomplished with a desired printing resolution by executing compensation with any desired length according to the boundary length, thereby improving the printing quality accordingly.

When print data contains both image data like graphics and character data, one may not want to perform the above-described compensation on image data in a certain area. A process in such a case will be discussed below referring to FIGS. 20A to 20H and 21.

When, for example, no compensation will be performed for whole a page, the controller 46 controls the ROM 50 not to output the UM and ML signal, and outputs the latch signal LAT1 and strobe signal STR1 shown in FIGS. 11S, 11T, 12S and 12T same as the conventional latch and strobe signals, instead of the latch signal LAT and strobe signal STR shown in FIGS. 11Q, 11R, 12Q and 12R.

Further, the compensation may be performed only a partial area of the page. For example, "S" in FIG. 20A is an area which is to be compensated, and "S'" is an area where no compensation will be performed. The area S' may be set by the controller 46.

Figure 21:
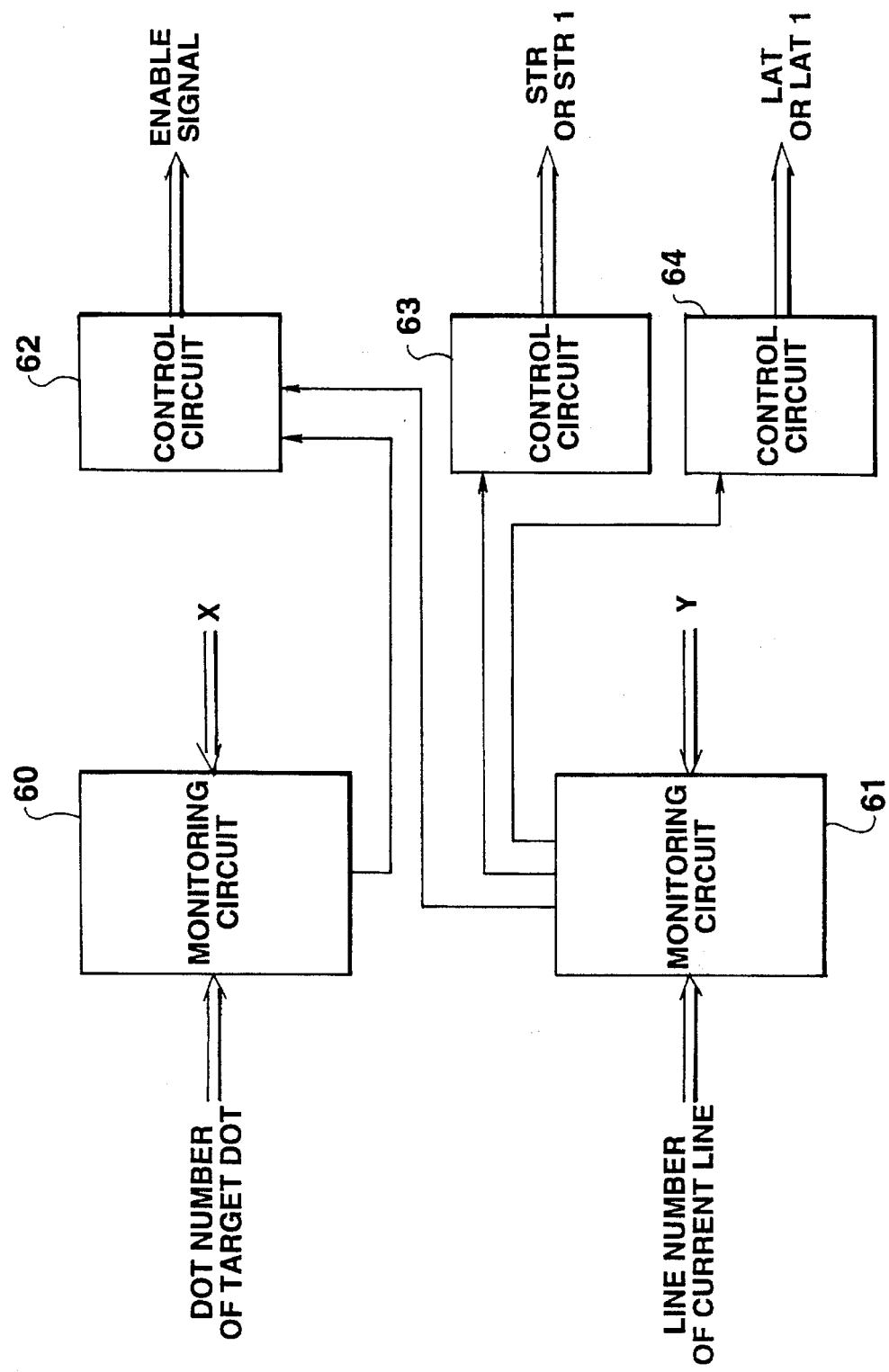
FIG. 21 is a circuit block diagram of a circuit system determining whether the compensation is carried out or not.

FIG. 21 presents a block diagram of a system which controls the execution of the compensation. This system comprises monitoring circuits 60 and 61 and control circuits 62 to 64.

The monitoring circuit 60 monitors dot number of the dot to be processed in the current line with dot numbers in a certain area X in the main-scanning direction. When the dot number of the dot to be processed coincides with one of the dot numbers in the area X in the main scanning direction, the monitoring circuit 60 outputs a signal indicating that the dot exists in the area X in the main scanning direction.

The monitoring circuit 61 monitors the line number of the current line in one page and the line numbers in the area Y in the sub-scanning direction. When the line number of the current line coincides with one the line numbers in the area Y, the monitoring circuit 61 outputs, to the control circuits 62, 63 and 64, a signal indicating that the current line exists in the area Y in the sub-scanning direction.

The control circuit 62 controls the boundary detector 36 to detect a boundary only while a target dot exists in the area S. That is, the boundary detector 36 does not perform a boundary detecting process when the target dot exists in area S'. When the boundary detecting process is not performed, neither the UM signal nor the ML signal is output. Therefore, the output circuits 56 and 57 do not output the U- and L-line inversion data. As a result, the processing circuit 45 receives the current line data at one input and data "0" at the other input, and outputs the current line data three times in the TW period.

The control circuit 63 receives the output of the monitoring circuit 61, outputs, to the LED head 5, the strobe signal STR shown in FIGS. 11R and 12R when the target dot exists in area X, and outputs the strobe signal STR1 shown in FIGS. 11T and 12T when the target dot does not exit in area X. The period of the strobe signal STR1 is three times of the period of the strobe signal STR.

The control circuit 64 receives the output of the monitoring circuit 61, outputs, to the LED head 5, the latch signal LAT shown in FIGS. 11Q and 12Q when the target dot exists in area X, and outputs the latch signal LAT1 shown in FIGS. 11S and 12S when the target dot does not exit in area X. The period of the latch signal LAT1 is three times of the period of the latch signal LAT.

The processing circuit 45 outputs same data in three times during TW period. There is no need to latch the same data three times nor to expose the same data three times. Therefore, when the target dot is in area S, the latch signal LAT1 and strobe signal STR1 are output instead of the latch signal LAT and strobe signal STR.

The latch signal LAT and the strobe signal STR shown in FIGS. 11Q, 11R, 12Q and 12R may be output when the target dot exist in the area S.

The compensation may also be designated only a part, as shown in FIG. 20B. More specifically, a user may freely designate a target area for the compensation as shown in FIGS. 20C to 20H through the controller 46. This processing is convenient when print data contains both image data like graphics and character data and the user may, or may not, want to perform the above-described compensation on image data in a certain area.

Although the foregoing description of the embodiment has been given of an LED printer using LEDs as the recording elements, the concept of this invention may well be adapted for use in a recording apparatus which is designed on any recording principle as long as the recording apparatus forms and records a set of dot images on a recording medium using recording elements fixedly aligned in the main scanning direction.

Figure 22A:
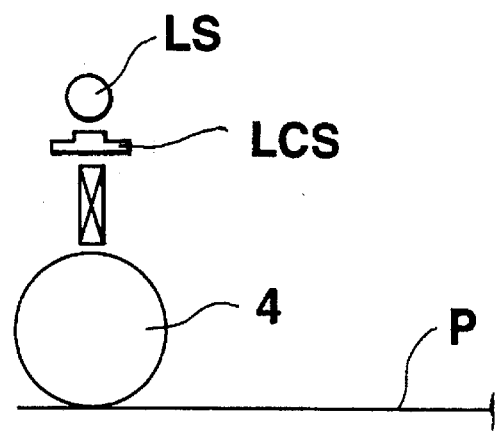
FIGS. 22A to 22D shows basic structures of other types of printers.

The recording apparatuses which form and record a set of dot images on a recording medium using recording elements fixedly aligned in the main scanning direction include a liquid crystal printer. The liquid crystal printer forms an electrostatic latent image in a desired dot pattern on a photosensitive body 4 using a liquid crystal shutter optical writing head LCS having many liquid crystal shutter elements aligned in the main scanning direction for controlling transmission of the light supplied from the light source LS, develops the electrostatic latent image with the toner, and then transfers the developed image on a sheet P as shown in FIG. 22A.

Figure 22B:

There may be a thermal printer which uses a thermal head TH having many heat generating elements aligned in the main scanning direction and forms and records an image of a given dot pattern on a heat-sensitive recording medium HSR as shown in FIG. 22B.

Figure 22C:
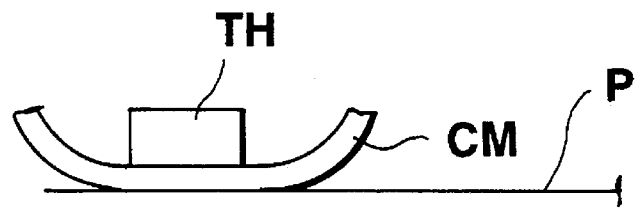

There also is a thermal transfer printer which uses a thermal head TH having many heat generating elements aligned in the main scanning direction to form pixels, and adheres thermal-melting or sublimation coloring materials on a recording medium P to record an image thereon by the heat from the thermal head TH, with a coloring member CM (for example, an inc ribbon) bearing the coloring materials placed between the thermal head TH and the recording medium as shown in FIG. 22C.

Figure 22D:
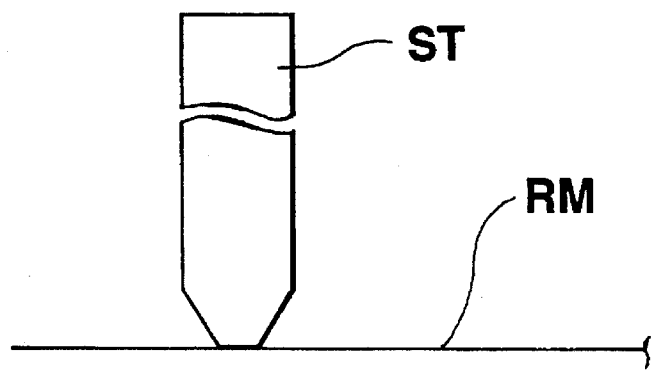
Figure 23A:
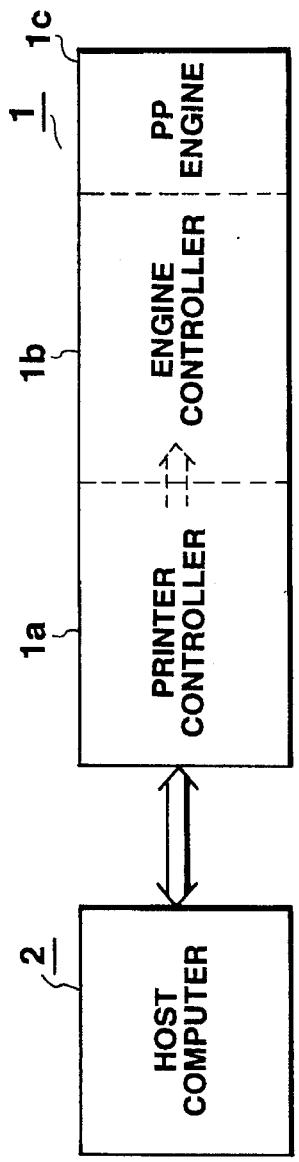
FIGS. 23A and 23B are diagrams for explaining the structure of a conventional recording apparatus.
Figure 23B:
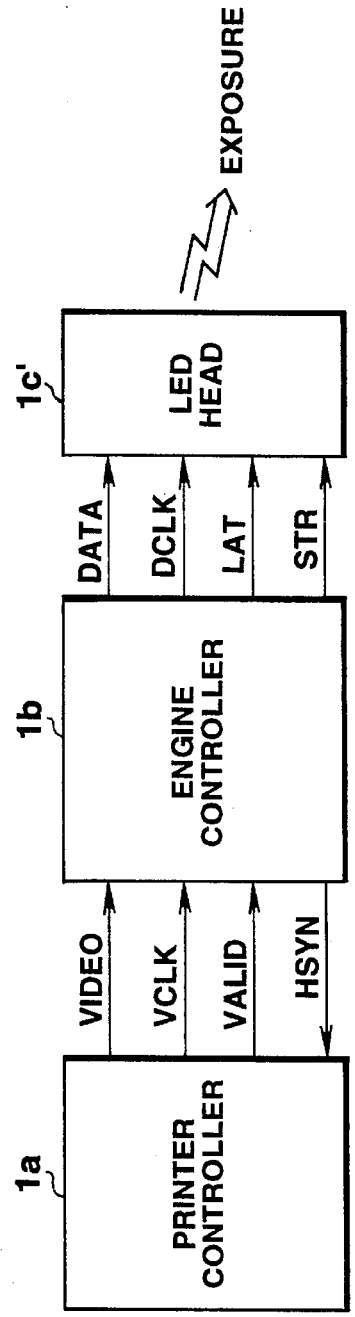
Figure 25:
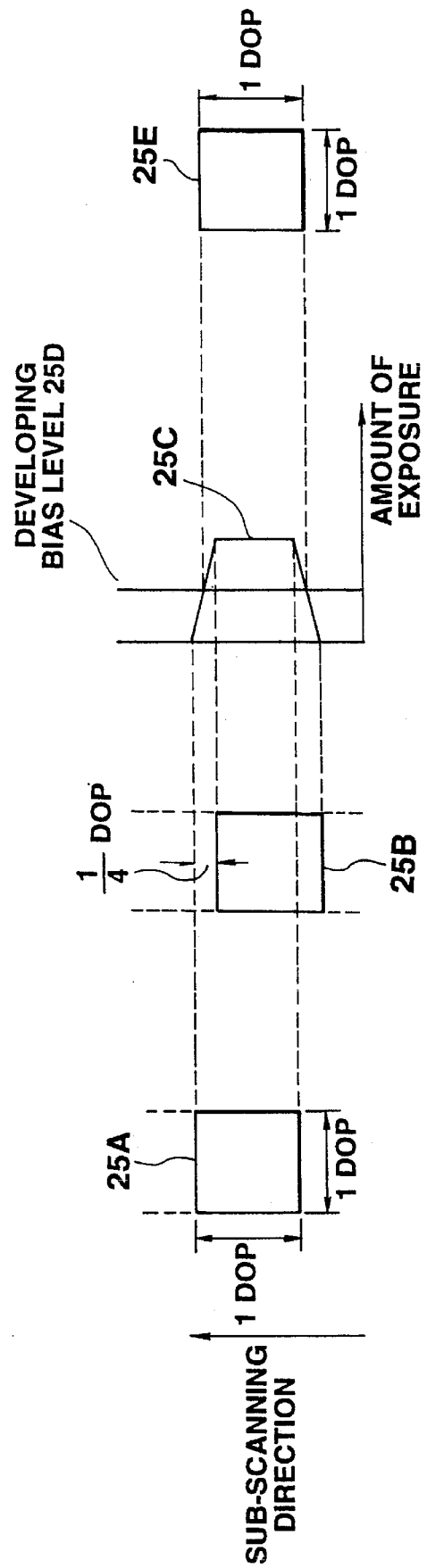
FIG. 25 is a diagram for explaining a 1-dot printing process which is executed by the conventional recording apparatus.

Further, there is a multi-stylus printer which uses a multi-stylus head ST having a number of static-charge generating stylus pins aligned in the main scanning direction to form an electrostatic image in a dot pattern on a recording medium RM, and develops and records the electrostatic image by means of a developing unit, as shown in FIG. 22D.

According to the present invention, as described above, a recording apparatus for recording image data using recording elements fixedly arranged in the main scanning direction is designed to have an improved resolution of a recorded image in the sub-scanning direction without increasing the memory capacity of a frame memory for cumulatively storing dot-based image data.

It is possible to freely set the number of divided lines, which constitute a compensation data line and are to be provided for the compensation purpose in accordance with the current line targeted for recording. It is therefore possible to accomplish printing with the desired resolution according to the usage or the user's intention and to improve the printing quality without significantly increasing the cost.

What is claimed is:

1. A recording apparatus comprising:

an array of recording elements arranged in a main scanning direction, for forming a dot image on a recording medium located substantially opposite to said recording elements;

reception means for receiving image data of a predetermined resolution;

a plurality of line data storage means for storing a dot line of data of interest of a printing target among said image data and aligned in said main scanning direction, and for storing plural dot lines of data preceding and following said dot line with respect to a sub-scanning direction;

recognition means for recognizing a boundary between white and black data characteristics of each dot line of data stored in each of said line data storage means;

compensation data generating means for converting said one dot line of data of interest of said printing target into N lines of compensation data, with respect to said sub-scanning direction, based on a position of said boundary, where N is an integer at least equal to 2; and drive/control means for selectively activating said recording elements for a predetermined time period based on said compensation data, wherein recording is accomplished with a resolution in said sub-scanning direction different from the predetermined resolution of said image data.

2. The recording apparatus according to claim 1, wherein said recording elements include light emitting elements and said recording medium includes a photosensitive body.

3. The recording apparatus according to claim 1, wherein said recording elements include heat generating elements and said recording medium is a heat-sensitive body.

4. The recording apparatus according to claim 1, wherein said recording elements include heat generating elements, and said recording medium faces said heat generating elements with a coloring member in between, said coloring member being for coloring said recording medium by a thermal effect.

5. The recording apparatus according to claim 1, wherein said recording elements include styluses for applying electric charges to said recording medium, and said recording medium includes a charging body.

6. The recording apparatus according to claim 1, further comprising:

area designating means for designating a predetermined area of said image data; and resolution designating means for designating whether or not high resolution recording is to be executed, wherein compensation data provided by said compensation data generating means is not utilized for recording within the predetermined area of said image data, but recording with said predetermined resolution is utilized for image data of the predetermined area designated by said area designating means.

7. An optical recording apparatus comprising:

an array of light emitting elements arranged in a main scanning direction, the array of light emitting elements providing optical data for forming an image in a predetermined dot pattern on a photosensitive body having a charged surface, the photosensitive body being substantially opposite to said light emitting elements;

reception means for receiving image data of a predetermined resolution;

a plurality of line data storage means for storing a dot line of data of interest as a printing target among said image data and aligned in said main scanning direction, and for storing plural dot lines of data preceding and following said dot line with respect to a sub-scanning direction;

compensation data generating means for converting said one dot line of data of interest of said printing target into N lines of compensation data, based on said plural dot lines of data preceding and following said one dot line;

selecting means for selecting light emitting elements to be activated in accordance with said compensation data;

drive means for applying a drive current only to said light emitting elements selected by said selecting means;

drive/control means for selectively activating said light emitting elements for a predetermined time based on said compensation data;

means for uniformly charging a surface of said photosensitive body;

means for moving said photosensitive body at a constant speed relative to said light emitting element; and developing means for supplying a developer to said surface of said photosensitive body on which an electrostatic latent image is formed through exposure by said light emitting element to thereby develop said electrostatic latent image, wherein high resolution recording is accomplished using a resolution in said sub-scanning direction which is greater than the predetermined resolution of said image data.

8. The recording apparatus according to claim 7, further comprising:

area designating means for designating a predetermined area of said image data; and resolution designating means for designating whether or not high resolution recording is to be executed, wherein compensation data provided by said compensation data generating means is not utilized for recording within the predetermined area of said image data, but recording with said predetermined resolution is utilized for image data of the predetermined area designated by said area designating means.

9. The recording apparatus according to claim 7, wherein said time for activating said light emitting elements is 1/N of an activation time for accomplishing recording with said predetermined resolution, and N exposure operations are executed according to N lines of compensation data during a write period for one dot line, where N is an integer at least equal to 2.

10. A recording apparatus comprising:

an array of recording elements arranged in a main scanning direction, for forming a dot image on a recording medium located substantially opposite to said recording elements;

reception means for receiving image data of a predetermined resolution, and for separating the received image data into plural dot-line data, each of the plurality of dot-line data including a plurality of dots arranged in a scanning direction having corresponding imaginary dot numbers assigned thereto;

a plurality of dot-line data buffers for storing dot-line data separated by said reception means;

a pattern table for storing a plurality of patterns including predetermined patterns representing a step portion;

control means for outputting at least a first direction signal and a second direction signal;

recognition means including retrieving means for successively retrieving N by N dot data including N by N dots out of N dot-line data stored in said plurality of dot-line data buffers with one bit shifted in an ascending order of the dot numbers of dots included in the dot line data, where N is an integer at least equal to 2, the N by N dot data including a current line data, while said control means outputs the first direction signal, and for successively retrieving N by N dot data including N by N dots out of the N dot-line data stored in said plural dot-line data buffers with one bit shifted in a descending order of the dot numbers of the dot-line data, while said control means outputs the second direction signal;

comparing means for successively comparing the N by N dot data retrieved by said recognition means with the plural patterns stored in said pattern table;

recognition signal output means for outputting a first recognition signal, when said comparing means determines that the N by N dot data coincides with one of the predetermined patterns among the plural patterns stored in said pattern table, and for outputting a second recognition signal, when said comparing means determines that the N by N dot data coincides with a pattern other than the predetermined patterns among the plural patterns stored in said pattern table;

a main counter responsive to the first recognition signal output by said recognition signal output means, for counting a number of the bits which are shifted for said retrieving means to successively retrieve N by N dot data while said recognition signal output means outputs the second recognition signal;

a divide by N counter responsive to the first recognition signal output by said recognition signal output means, for counting the bits which are shifted for said retrieving means to successively retrieve N by N dot data;

first output means for outputting the current line data included in the N by N dot data successively retrieved by said retrieving means;

second output means for inverting the current line data included in the N by N dot data successively retrieved by said retrieving means, during a period in which said divide by N counter executes counting operation while said control means outputs the first direction signal, and for outputting the inverted data;

third output means for inverting the current line data included in the N by N dot data successively retrieved by said retrieving means, during a period in which said divide by N counter executes the counting operation while said control means outputs the second direction signal, and for outputting the inverted data; and supplying means for successively supplying data output from said first, second and third output means to said printing elements to drive the same.

* * * * *